US009096182B1

(12) United States Patent
Roth et al.

(10) Patent No.: US 9,096,182 B1
(45) Date of Patent: Aug. 4, 2015

(54) BICYCLE RACK FOR A VEHICLE

(71) Applicant: Allfab, Inc., Columbus, OH (US)

(72) Inventors: Russell William Roth, Ashville, OH (US); Lonnie Joe Kyer, Galloway, OH (US)

(73) Assignee: Allfab, Inc., Columbus, OH (US)

( * ) Notice: Subject to any disclaimer, the term of this patent is extended or adjusted under 35 U.S.C. 154(b) by 0 days.

(21) Appl. No.: 14/452,805

(22) Filed: Aug. 6, 2014

Related U.S. Application Data

(60) Provisional application No. 61/862,930, filed on Aug. 6, 2013.

(51) Int. Cl.
| | |
|---|---|
| *B60R 9/00* | (2006.01) |
| *B60R 11/00* | (2006.01) |
| *B60R 9/10* | (2006.01) |
| *B60R 9/06* | (2006.01) |

(52) U.S. Cl.
CPC ... *B60R 9/10* (2013.01); *B60R 9/00* (2013.01); *B60R 9/06* (2013.01); *B60R 11/00* (2013.01)

(58) Field of Classification Search
CPC .................................. B60R 9/00; B60R 11/00
USPC ........... 224/519, 521, 536, 537, 461; 414/462
See application file for complete search history.

(56) References Cited

U.S. PATENT DOCUMENTS

| | | | | | |
|---|---|---|---|---|---|
| 3,529,737 | A | * | 9/1970 | Daugherty | 414/462 |
| 3,843,001 | A | * | 10/1974 | Willis | 414/462 |
| 4,629,104 | A | | 12/1986 | Jacquet | |
| 5,025,932 | A | * | 6/1991 | Jay | 211/20 |
| 5,476,203 | A | * | 12/1995 | Fletcher | 224/536 |
| 5,549,231 | A | * | 8/1996 | Fletcher et al. | 224/536 |
| 5,658,119 | A | | 8/1997 | Allsop et al. | |
| 5,692,659 | A | * | 12/1997 | Reeves | 224/536 |
| 5,820,002 | A | * | 10/1998 | Allen | 224/324 |
| 5,833,074 | A | * | 11/1998 | Phillips | 211/21 |
| 5,947,357 | A | * | 9/1999 | Surkin | 224/536 |
| 6,019,266 | A | * | 2/2000 | Johnson | 224/534 |
| 6,244,483 | B1 | * | 6/2001 | McLemore et al. | 224/521 |
| 6,460,743 | B2 | * | 10/2002 | Edgerly et al. | 224/324 |

(Continued)

FOREIGN PATENT DOCUMENTS

| | | |
|---|---|---|
| EP | 1285817 A2 | 2/2003 |
| EP | 1059205 B1 | 7/2003 |
| EP | 1106437 B1 | 10/2003 |

*Primary Examiner* — Justin Larson
*Assistant Examiner* — Lester L Vanterpool
(74) *Attorney, Agent, or Firm* — The Law Office of Patrick F. O'Reilly III, LLC

(57) ABSTRACT

A bicycle rack for a vehicle is disclosed herein. In one or more embodiments, the bicycle rack includes: (i) a central support assembly; (ii) a first rail member coupled to the central support assembly, the first rail member having an elongate groove formed therein for receiving a portion of a first wheel of a bicycle; (iii) a second rail member coupled to the central support assembly, the second rail member having an elongate groove formed therein for receiving a portion of a second wheel of the bicycle; (iv) a first pedal support assembly coupled to the central support assembly, the first pedal support assembly configured to structurally engage a first pedal of the bicycle in a supporting relationship; and (v) a second pedal support assembly coupled to the central support assembly, the second pedal support assembly configured to structurally engage a second pedal of the bicycle in a supporting relationship.

20 Claims, 20 Drawing Sheets

(56) References Cited

U.S. PATENT DOCUMENTS

| | | | |
|---|---|---|---|
| 6,626,340 B1 * | 9/2003 | Burgess | 224/536 |
| 6,752,303 B2 * | 6/2004 | McLemore et al. | 224/521 |
| 6,761,297 B1 * | 7/2004 | Pedrini | 224/519 |
| 7,806,307 B2 * | 10/2010 | Bergerhoff et al. | 224/496 |
| 7,815,084 B2 * | 10/2010 | Allen et al. | 224/537 |
| 7,909,213 B2 * | 3/2011 | Bergerhoff et al. | 224/197 |
| 8,418,902 B2 * | 4/2013 | Cha et al. | 224/496 |
| 8,496,148 B2 * | 7/2013 | Farney | 224/497 |
| 2002/0005422 A1 | 1/2002 | Nusbaum | |
| 2003/0042281 A1 * | 3/2003 | Ishikura | 224/319 |
| 2003/0132259 A1 * | 7/2003 | McLemore et al. | 224/519 |
| 2003/0164390 A1 * | 9/2003 | Higginbotham, III | 224/519 |
| 2003/0222112 A1 * | 12/2003 | McLemore et al. | 224/521 |
| 2007/0102465 A1 * | 5/2007 | Wezyk et al. | 224/321 |
| 2011/0108592 A1 * | 5/2011 | Lee et al. | 224/488 |
| 2013/0062383 A1 * | 3/2013 | Jeli | 224/497 |

\* cited by examiner

FIG. 16A   FIG. 16B

BICYCLE RACK FOR A VEHICLE

CROSS-REFERENCE TO RELATED APPLICATIONS

This patent application claims priority to, and incorporates by reference in its entirety, U.S. Provisional Patent Application No. 61/862,930, entitled "Bicycle Rack For A Vehicle", filed on Aug. 6, 2013.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

INCORPORATION BY REFERENCE OF MATERIAL SUBMITTED ON A COMPACT DISK

Not Applicable.

BACKGROUND OF THE INVENTION

1. Field of the Invention

The invention generally relates to a bicycle rack. More particularly, the invention relates to a bicycle rack that is configured to mount on a vehicle, such as a car, a truck, or a recreational vehicle (RV).

2. Background and Description of Related Art

Conventional bicycle racks are known that support a bicycle from a car by its frame and wheels. However, these conventional bicycle racks tend to impart an undue amount of stress on the frames and wheels of bicycles when they transported. This is even more of a problem with the design of today's newer high performance bicycles. The frames of these high performance bicycles often employ materials, such as carbon fiber, that can be catastrophically damaged by misapplied clamping forces exerted thereon. Also, many of these high-end bicycles are even using carbon fibers and composites for wheel construction.

Therefore, what is needed is a bicycle rack for a vehicle that is capable of supporting a bicycle from the bike components that are designed to withstand the greatest forces during the normal use of the bicycle. Also, a bicycle rack is needed that can be effectively used with high performance bicycles without damaging any of the special materials employed by these bicycles. In addition, a bicycle rack is needed that applies clamping pressure at the points on the bicycle that are most capable of withstanding such pressure.

BRIEF SUMMARY OF EMBODIMENTS OF THE INVENTION

Accordingly, the present invention is directed to a bicycle rack for a vehicle that substantially obviates one or more problems resulting from the limitations and deficiencies of the related art.

In accordance with one or more embodiments of the present invention, there is provided a bicycle rack for a vehicle that includes: (i) a central support assembly; (ii) a first rail member coupled to the central support assembly, the first rail member having an elongate groove formed therein for receiving a portion of a first wheel of a bicycle; (iii) a second rail member coupled to the central support assembly, the second rail member having an elongate groove formed therein for receiving a portion of a second wheel of the bicycle; (iv) a first pedal support assembly coupled to the central support assembly, the first pedal support assembly configured to structurally engage a first pedal of the bicycle in a supporting relationship; and (v) a second pedal support assembly coupled to the central support assembly, the second pedal support assembly configured to structurally engage a second pedal of the bicycle in a supporting relationship.

In a further embodiment of the present invention, the central support assembly comprises a trailer hitch mounting bar, the trailer hitch mounting bar configured to be received within a receiver of a trailer hitch assembly on a vehicle.

In yet a further embodiment, the first rail member and the second rail member are pivotally coupled to the central support assembly.

In still a further embodiment, the bicycle rack further comprises at least one chock member, at least a portion of the at least one chock member received within the elongate groove of one of the first and second rail members, the at least one chock member configured to stabilize one of the first and second wheels of the bicycle in the one of the first and second rail members.

In yet a further embodiment, the at least one chock member comprises a first chock member and a second chock member, at least a portion of the first chock member received within the elongate groove of the first rail member, at least a portion of the second chock member received within the elongate groove of the second rail member, the first and second chock members configured to stabilize the first and second wheels of the bicycle in respective first and second rail members.

In still a further embodiment, each of the first and second pedal support assemblies comprises an adjustable upright support member and a clamping subassembly.

In yet a further embodiment, the clamping subassembly comprises a lower clamping plate and an upper clamping plate, a respective one of the first and second pedals of the bicycle configured to be sandwiched between the lower clamping plate and the upper clamping plate.

In still a further embodiment, the clamping subassembly further comprises a threaded clamping rod and an adjustable pivot pin, the threaded clamping rod having a first end and a second end, a first end of the threaded clamping rod engaging a plurality of internal threads in the lower clamping plate and/or in a weld nut attached thereto, a second end of the threaded clamping rod operatively coupled to the adjustable pivot pin, the upper clamping plate configured to rotate about the adjustable pivot pin.

In yet a further embodiment, the clamping subassembly further comprises a lower clamping bracket attached to the lower clamping plate and a pivotable clamping latch member, the pivotable clamping latch member being rotatably coupled to the adjustable upright support member, and the pivotable clamping latch member including a lock eye for receiving a shackle portion of a padlock.

In still a further embodiment, the clamping subassembly further comprises a lower compression pad and an upper compression pad, the lower compression pad coupled to the lower clamping plate, and the upper compression pad coupled to the upper clamping plate, wherein the upper and lower compression pads are configured to be sandwiched between the respective one of the first and second pedals of the bicycle and a respective one of the upper and lower clamping plates.

In yet a further embodiment, each of the first and second pedal support assemblies is configured to engage a shoe cleat locking mechanism on a bicycle pedal.

In still a further embodiment, the bicycle is configured to be mounted in at least one of the following locations: (i) proximate to the rear bumper of a vehicle; and (ii) on the roof of a vehicle.

In yet a further embodiment, two or more sets of rail members and pedal support assemblies are mounted on the central support assembly so that two or more bicycles are capable of being transported by a vehicle using the bicycle rack.

In still a further embodiment, each of the two or more sets of rail members are disposed in a generally parallel relationship to one another.

In yet a further embodiment, one clamping subassembly from each of the two or more sets of pedal support assemblies is mounted on a single adjustable upright support member.

In accordance with one or more other embodiments of the present invention, there is provided a bicycle rack for a vehicle that includes: (i) a central support assembly; (ii) at least one rail member coupled to the central support assembly, the at least one rail member having an elongate groove formed therein for receiving a portion of a first wheel and a portion of a second wheel of a bicycle; (iii) a first pedal support assembly coupled to the central support assembly, the first pedal support assembly configured to structurally engage a first pedal of the bicycle in a supporting relationship; and (iv) a second pedal support assembly coupled to the central support assembly, the second pedal support assembly configured to structurally engage a second pedal of the bicycle in a supporting relationship.

In accordance with yet one or more other embodiments of the present invention, there is provided a bicycle system for a vehicle that comprises a bicycle having a frame, a first wheel rotatably coupled to the frame, a second wheel rotatably coupled to the frame, and first and second pedals operatively coupled to the second wheel; and a bicycle rack configured to support the bicycle from a vehicle, the bicycle rack including: (i) a central support assembly; (ii) a first rail member coupled to the central support assembly, the first rail member having an elongate groove formed therein for receiving a portion of the first wheel of the bicycle; (iii) a second rail member coupled to the central support assembly, the second rail member having an elongate groove formed therein for receiving a portion of the second wheel of the bicycle; (iv) a first pedal support assembly coupled to the central support assembly, the first pedal support assembly configured to structurally engage the first pedal of the bicycle in a supporting relationship; and (v) a second pedal support assembly coupled to the central support assembly, the second pedal support assembly configured to structurally engage the second pedal of the bicycle in a supporting relationship.

In a further embodiment of the present invention, the first rail member and the second rail member of the bicycle rack are pivotally coupled to the central support assembly, and wherein the first rail member and the second rail member are configured to be locked in an upright position by respective pin members.

In yet a further embodiment, the central support assembly comprises a trailer hitch vertical post member, the trailer hitch vertical post member configured to engage with a bracket member of a vertically-oriented trailer hitch assembly on a vehicle.

In still a further embodiment, each of the first and second pedal support assemblies comprises one or more clamping subassemblies and a plurality of pedal insert members, each of the pedal insert members having one or more protruding portions for engaging with apertures in at least one of the first and second pedals of the bicycle.

It is to be understood that the foregoing general description and the following detailed description of the present invention are merely exemplary and explanatory in nature. As such, the foregoing general description and the following detailed description of the invention should not be construed to limit the scope of the appended claims in any sense.

BRIEF DESCRIPTION OF THE SEVERAL VIEWS OF THE DRAWINGS

The invention will now be described, by way of example, with reference to the accompanying drawings, in which.

Throughout the figures, the same parts are always denoted using the same reference characters so that, as a general rule, they will only be described once.

DETAILED DESCRIPTION OF EMBODIMENTS OF THE INVENTION

Figure 1:
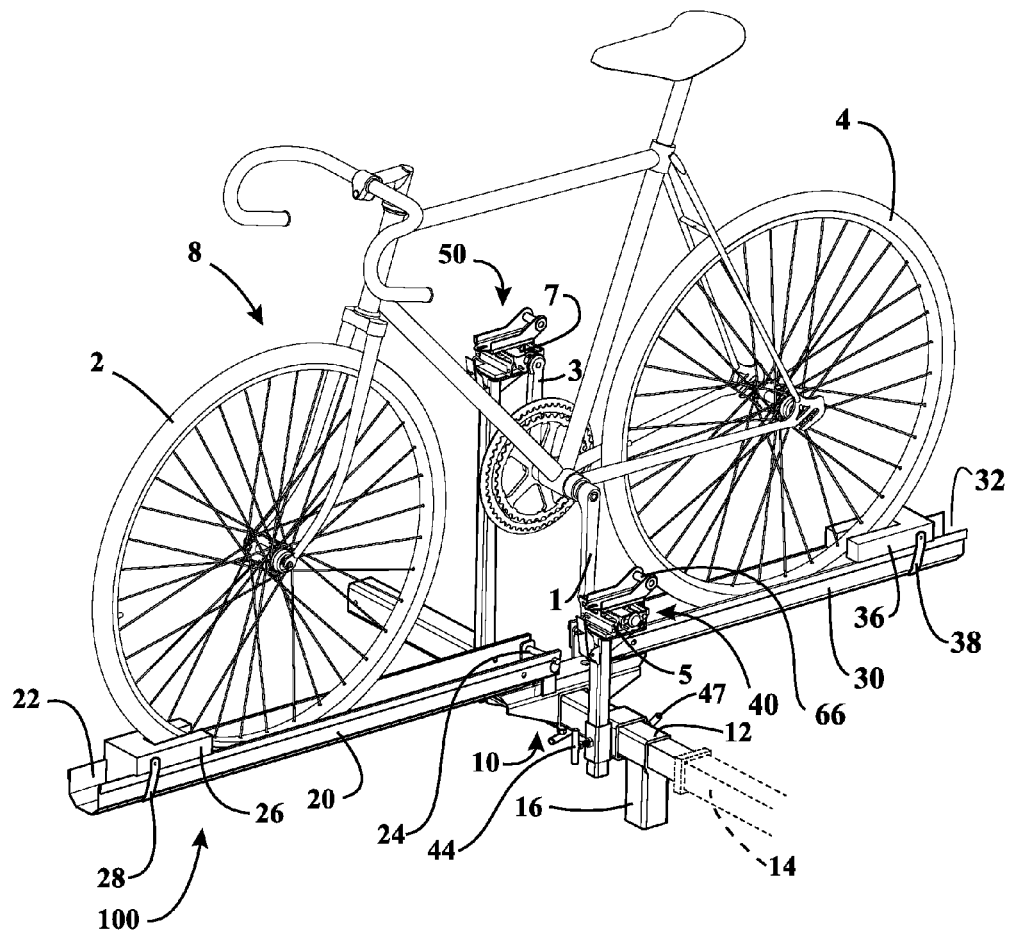
FIG. 1 is a side perspective view of a bicycle rack, according to a first embodiment of the invention.
Figure 2:
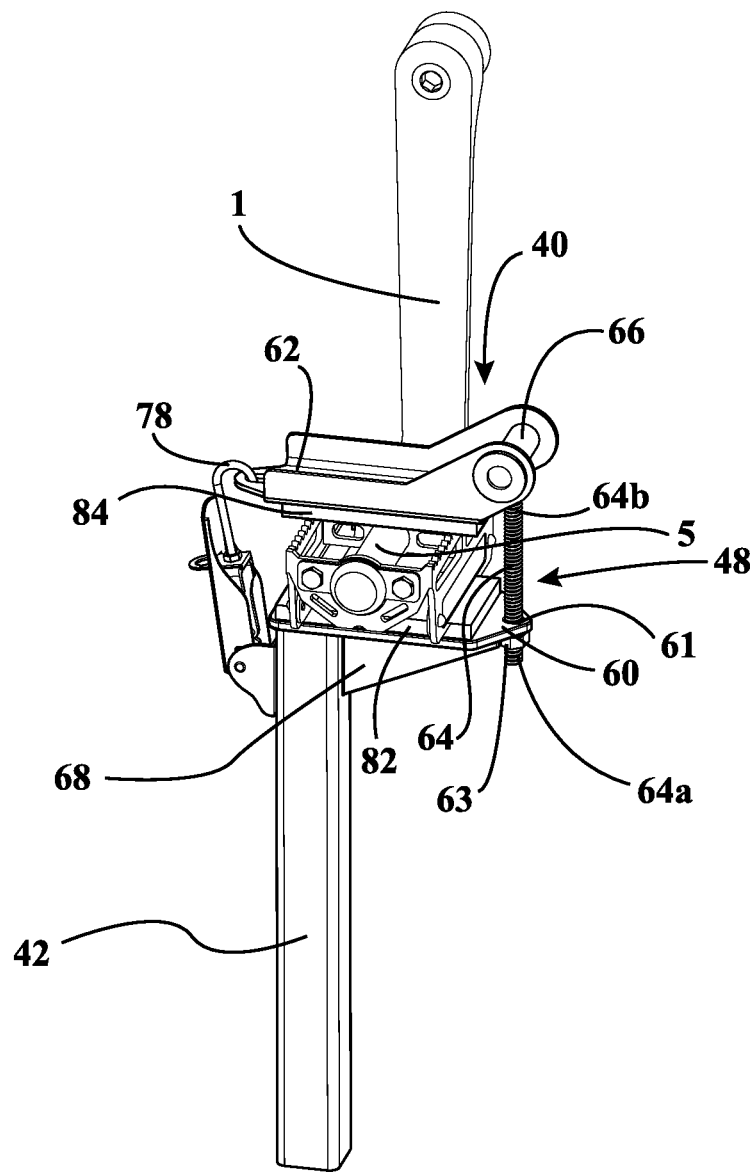
FIG. 2 is a side perspective view of a pedal clamping subassembly of the bicycle rack, according to the first embodiment of the invention.
Figure 3:
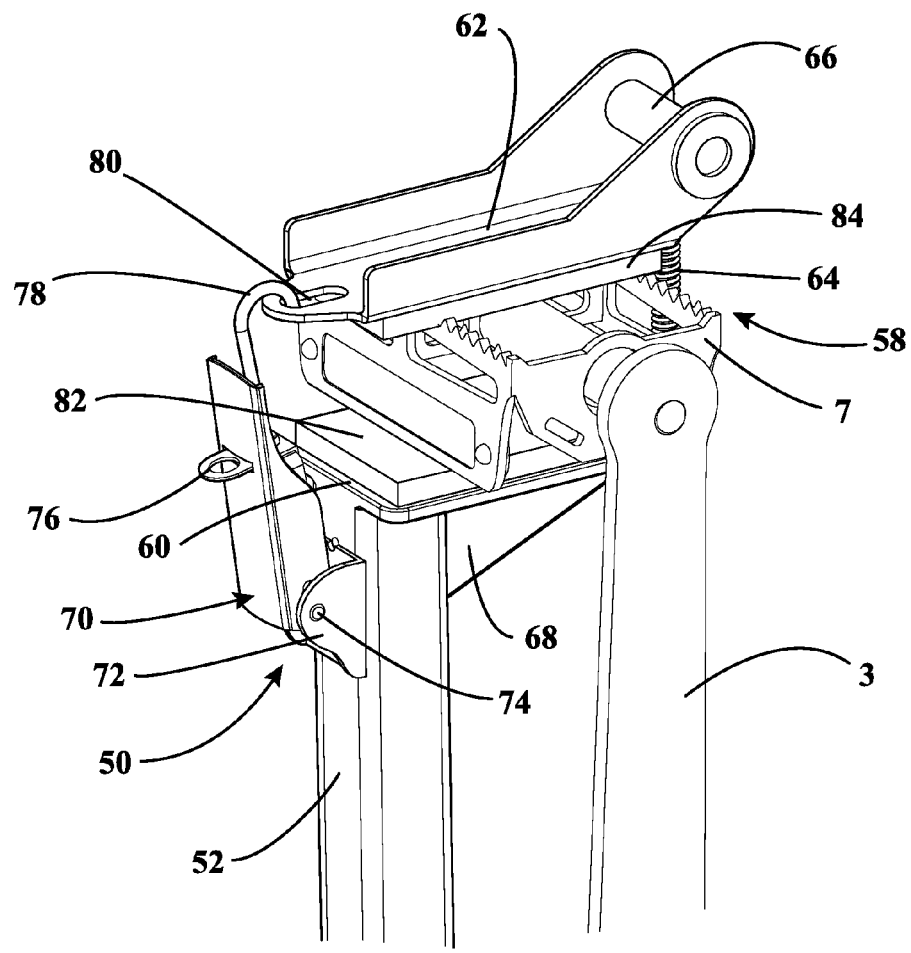
FIG. 3 is a side-end perspective view of another pedal clamping subassembly of the bicycle rack, according to the first embodiment of the invention.

A first embodiment of the bicycle rack is seen generally at 100 in FIGS. 1-3. With initial reference to FIG. 1, it can be seen that the bicycle rack 100 generally comprises a central support assembly 10; a first rail member 20 coupled to the central support assembly 10, the first rail member 20 having an elongate groove 22 formed therein for receiving a portion of a first wheel 2 of a bicycle 8; a second rail member 30 coupled to the central support assembly 10, the second rail member 30 having an elongate groove 32 formed therein for receiving a portion of a second wheel 4 of the bicycle 8; a first pedal support assembly 40 coupled to the central support assembly 10, the first pedal support assembly 40 configured to structurally engage a first pedal 5 of the bicycle 8 in a supporting relationship; and a second pedal support assembly 50 coupled to the central support assembly 10, the second pedal support assembly 50 configured to structurally engage a second pedal 7 of the bicycle 8 in a supporting relationship. As shown in FIG. 1, the central support assembly 10 of the bicycle rack 100 comprises a trailer hitch mounting bar 12. The trailer hitch mounting bar 12 is configured to be inserted over, or received within a receiver 14 of a trailer hitch assembly on a vehicle (shown in dashed lines). In one embodiment, the receiver 14 is a standard two (2) inch receiver that is adaptable to one and one-quarter (1¼) inches. A five-eighths (⅝) of an inch locking pin can be used to secure the trailer hitch mounting bar 12 in the receiver 14.

Figure 13:
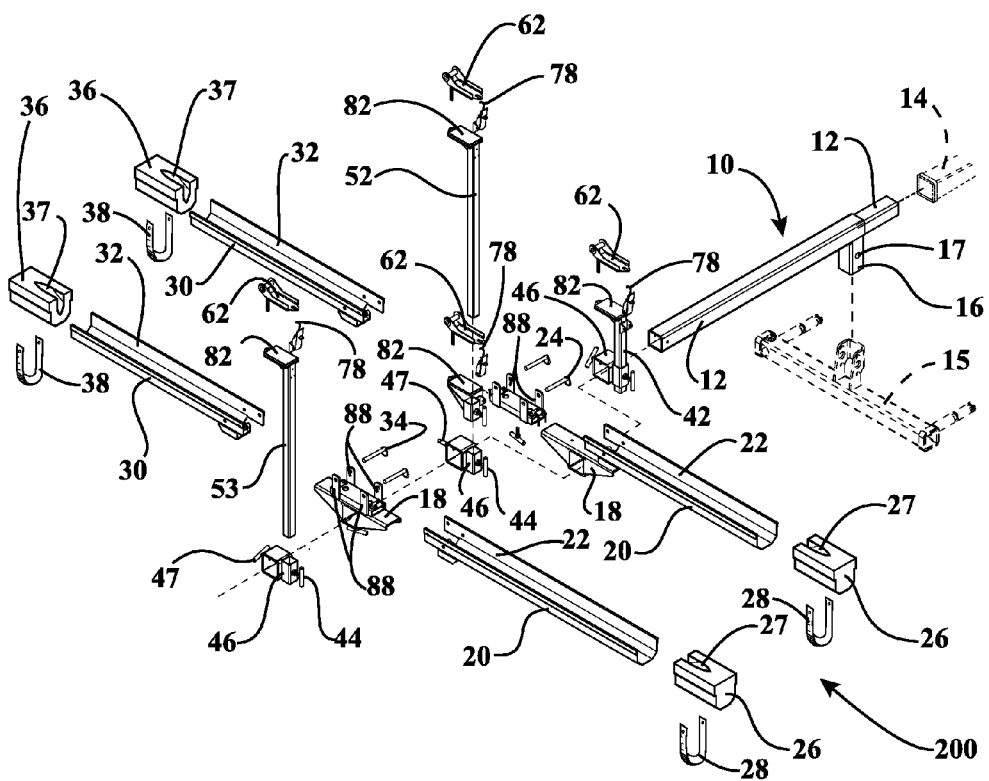
FIG. 13 is an exploded perspective view of the bicycle rack designed for carrying at least two bicycles, according to the second embodiment of the invention.

While a horizontal-style trailer hitch receiver 14 is illustrated in FIG. 1, it is to be understood that the central support assembly 10 is also capable of being readily attached to a vertical-style trailer hitch 15 (e.g., see FIG. 13, vertical-style trailer hitch 15 is shown in dashed lines). In particular, with combined reference to FIGS. 1 and 13, it can be seen that the trailer hitch mounting bar 12 of the central support assembly 10 comprises a vertical support post member 16 extending downwardly from a bottom surface of the trailer hitch mounting bar 12. The vertical support post member 16 engages with the vertical bracket member centrally disposed on the vertical-style trailer hitch 15 (see FIG. 13). As shown in FIG. 13, the vertical support post member 16 is provided with a set of apertures 17 disposed therethrough for receiving a pin that secures the vertical support post member 16 of the central support assembly 10 of the bicycle rack to the vertical bracket member of the vertical-style trailer hitch 15. Advantageously, the vertical support post member 16 of the central support assembly 10 allows the bicycle rack to be readily used with vertical-style trailer hitches 15, such as those used on a MINI Cooper® car or another other vehicle. Thus, the central support assembly 10 of the bicycle rack 100 can be readily used with many different styles of trailer hitches on many different types of vehicles.

Figure 7:
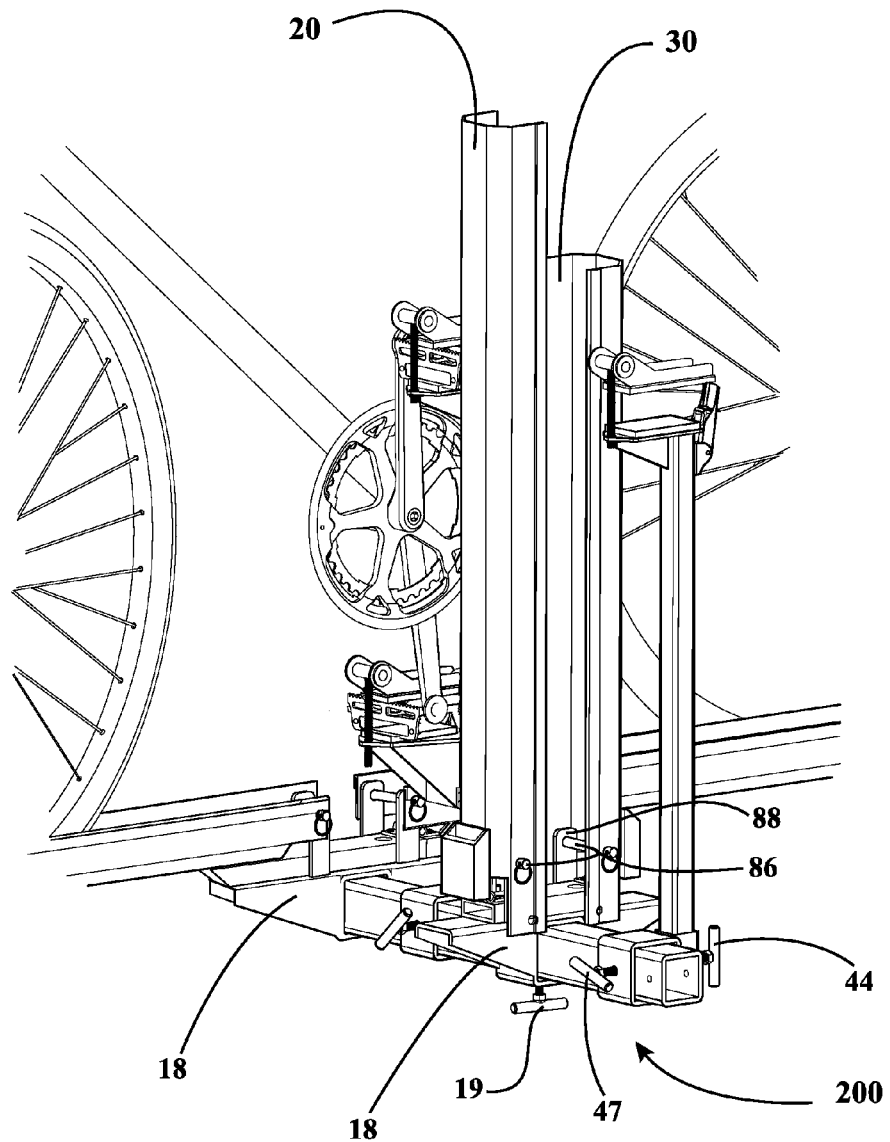
FIG. 7 is another partial side perspective view of the bicycle rack designed for carrying at least two bicycles, according to the second embodiment of the invention, wherein one set of rail members is in a folded-up position and the other set of rail members is in a folded-dwon position.
Figure 8:
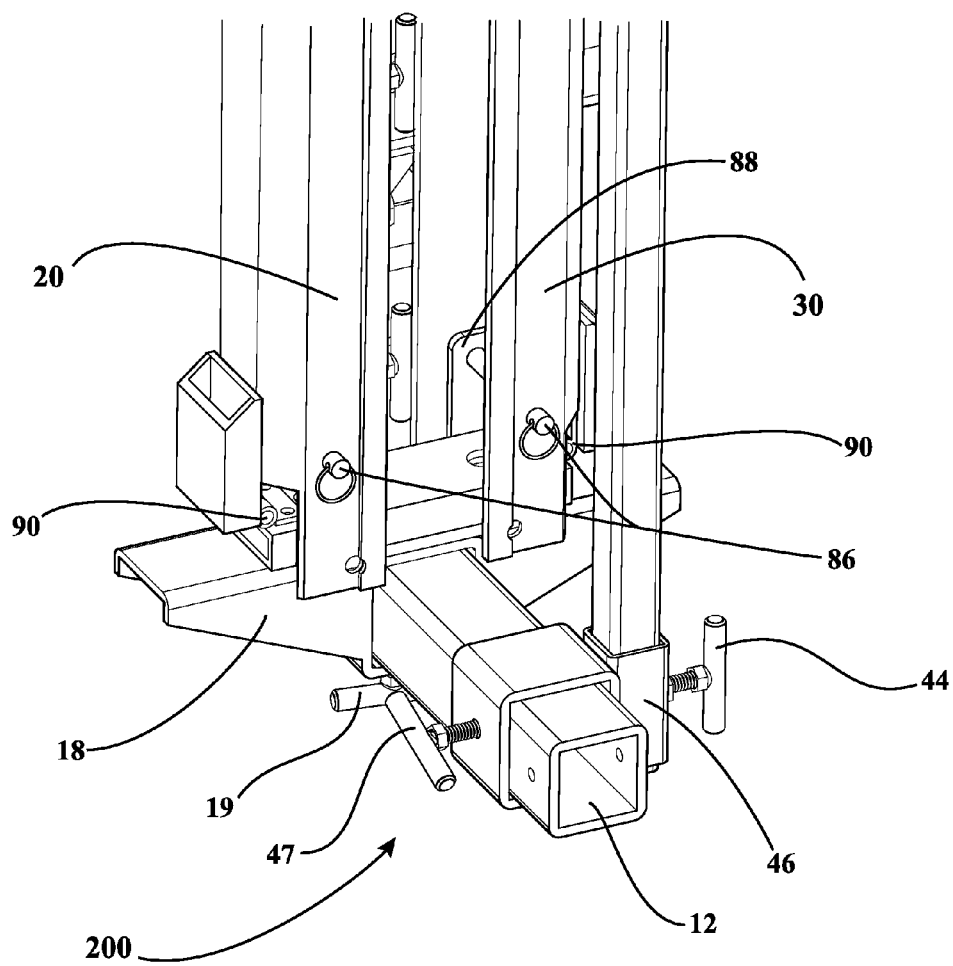
FIG. 8 is an enlarged perspective view of a central support assembly of the bicycle rack designed for carrying at least two bicycles, according to the second embodiment of the invention, wherein one set of rail members is illustrated in a folded-up position.
Figure 9:
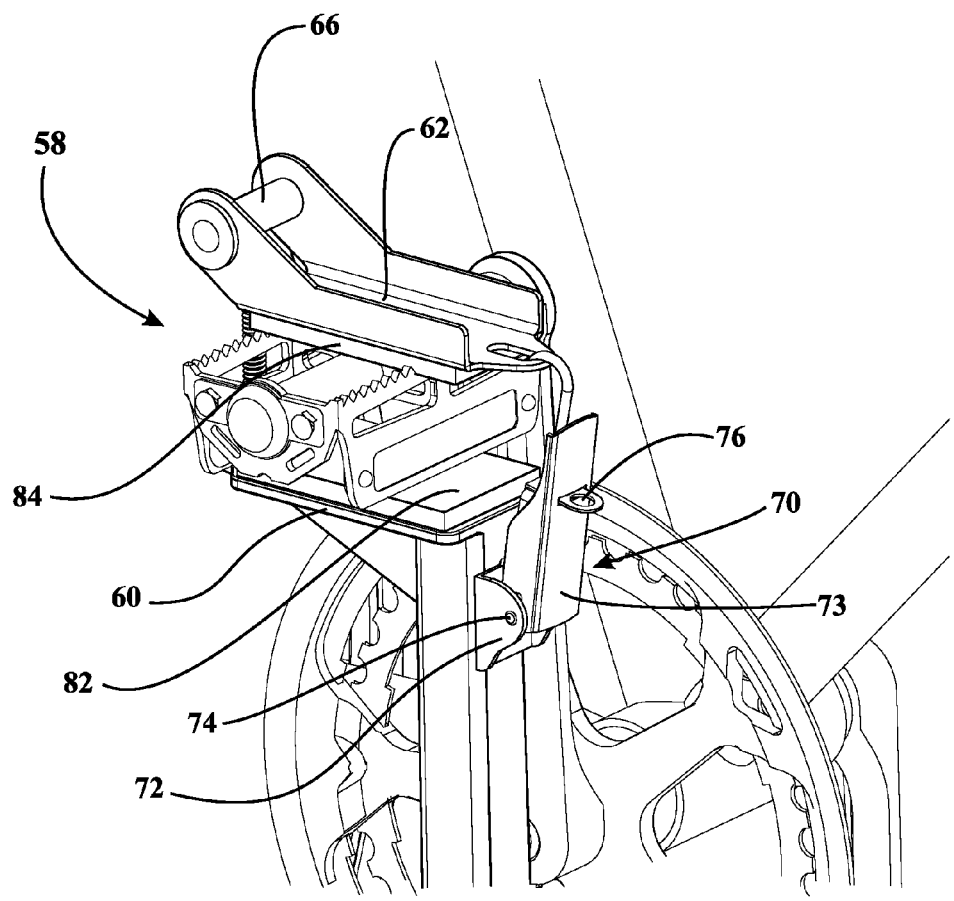
FIG. 9 is a front end-side perspective view of a pedal clamping subassembly of the bicycle rack designed for carrying at least two bicycles, according to the second embodiment of the invention.

Referring again to FIGS. 1 and 4, it can be seen that the first rail member 20 and the second rail member 30 are pivotally coupled to the central support assembly 10 by means of respective pivot pins 24 and 34. Advantageously, the pivotable nature of the first and second rail members 20, 30 allows them to be folded-up (see e.g., FIGS. 7 and 8) so that the bicycle rack can be made more compact when bicycles are not being transported thereon. As depicted in the figures, each of the first and second rail members 20, 30 is capable of being rotated approximately 90 degrees from a folded-down position (i.e., the FIG. 1 position) to a folded-up position (i.e., the position of the forward-most bicycle rack in FIGS. 7 and 8). That is, each of the first and second rail members 20, 30 can be rotated inwardly from a generally co-linear horizontal position to an upright position, wherein the first and second rail members 20, 30 are disposed generally parallel to one another and are spaced apart by a gap. As best shown in FIG. 8, each rail member 20, 30 is rotatably coupled to a rail member support carriage 18 by means of a respective hinge member 90. With reference to FIG. 1, the first rail member 20 is rotated in a clockwise direction from its folded-down position to its folded-up position, while the second rail member 30 is rotated in a counter-clockwise direction from its folded-down position to its folded-up position. As shown in FIG. 7, when the first and second rail members 20, 30 are rotated into their folded-up positions, they are able to be locked in place for compact storage using rail locking pin members 86. In particular, the rail locking pin members 86 (e.g., clevis pin members 86) are received within apertures disposed in opposite sides of rail members 20, 30, and also are received within respective apertures in rail locking pin protrusions 88 (see FIGS. 7 and 12). As such, the rail locking pin members 86 lock the first and second rail members 20, 30 in an upward position, and prevent the rotation of the first and second rail members 20, 30, by virtue of their engagement with the apertures disposed in opposite sides of rail members 20, 30 and the apertures in rail locking pin protrusions 88.

As shown in FIGS. 4-8, the central support assembly 10 of the bicycle rack comprises one or more rail member support carriages 18 to which respective pairs of the first and second rail members 20, 30 are pivotally coupled. Each rail member support carriage 18 supports one pair of first and second rail members 20, 30. As best shown in FIGS. 8 and 13, each of the rail member support carriages 18 comprises a pair of gusset-style bracket members that are mounted on opposed sides of a collar portion. The collar portion of each rail member support carriage 18 is slidingly received on the trailer hitch mounting bar 12 of the central support assembly 10, and then fixed in place relative to the trailer hitch mounting bar 12 by rotating the handle portion 19 on the bottom of rail member support carriage 18. When the handle portion 19 is turned in a tightening direction by a user of the bicycle rack, a head of a bolt disposed opposite to the handle portion 19 is tightened against the bottom side of the trailer hitch mounting bar 12, thereby fixing the position of the rail member support carriage 18 relative to the bar 12. Advantageously, by virtue of being pivotally coupled to a respective rail member support carriage 18, each pair of first and second rail members 20, 30 can be selectively attached and removed to the trailer hitch mounting bar 12. To attach each rail member support carriage 18 and its associated first and second rail members 20, 30 to the trailer hitch mounting bar 12, a user simply slips the collar portion of the rail member support carriage 18 over the end of the bar 12, slides the carriage 18 along the bar until the desired position on the bar 12 is reached, and then locks the carriage 18 in place by rotating the handle portion 19 in a tightening direction. Conversely, to remove each rail member support carriage 18 and its associated first and second rail members 20, 30 from the trailer hitch mounting bar 12, a user simply rotates the handle portion 19 in a loosening direction until the carriage 18 is free to slide relative to the bar 12, and then removes the carriage 18 from the end of the trailer hitch mounting bar 12. As such, due to the module nature of each rail member support carriage 18 and its associated first and second rail members 20, 30, a user of the bicycle rack can customize the bicycle rack to fit his or her particular bicycle carrying needs. That is, a user may use the bicycle rack to carry a single bicycle, two bicycles, three bicycles, four bicycles, etc.

In one or more embodiments, the first and second rail members 20, 30 are in the form of extruded trough-like members with the following features: (i) bulbed opposed upper ends for added strength and rigidity, (ii) tapered arms at the lower portion of the rail member profile for weight reduction, (iii) a thickened profile base to prevent fastener pull-through (i.e., when fasteners pass through the base of the rail member profile), and (iv) an anodized finish. As an alternative to providing bulbed opposed upper ends on the rail member profile, the rail member profile can be provided with bent opposed ends 92 (refer to FIGS. 5 and 11). In one exemplary embodiment, the first and second rail members 20, 30 are formed from extruded aluminum for durability and minimizing the weight thereof. Advantageously, the tapered sides of the first and second rail members 20, 30 accept narrow to wide bicycle tire types. In one exemplary embodiment, the components of the bicycle rack 100, 200 are formed from one or more suitable metals (e.g., steel, aluminum, etc.) for suitable strength and durability.

Figure 11:
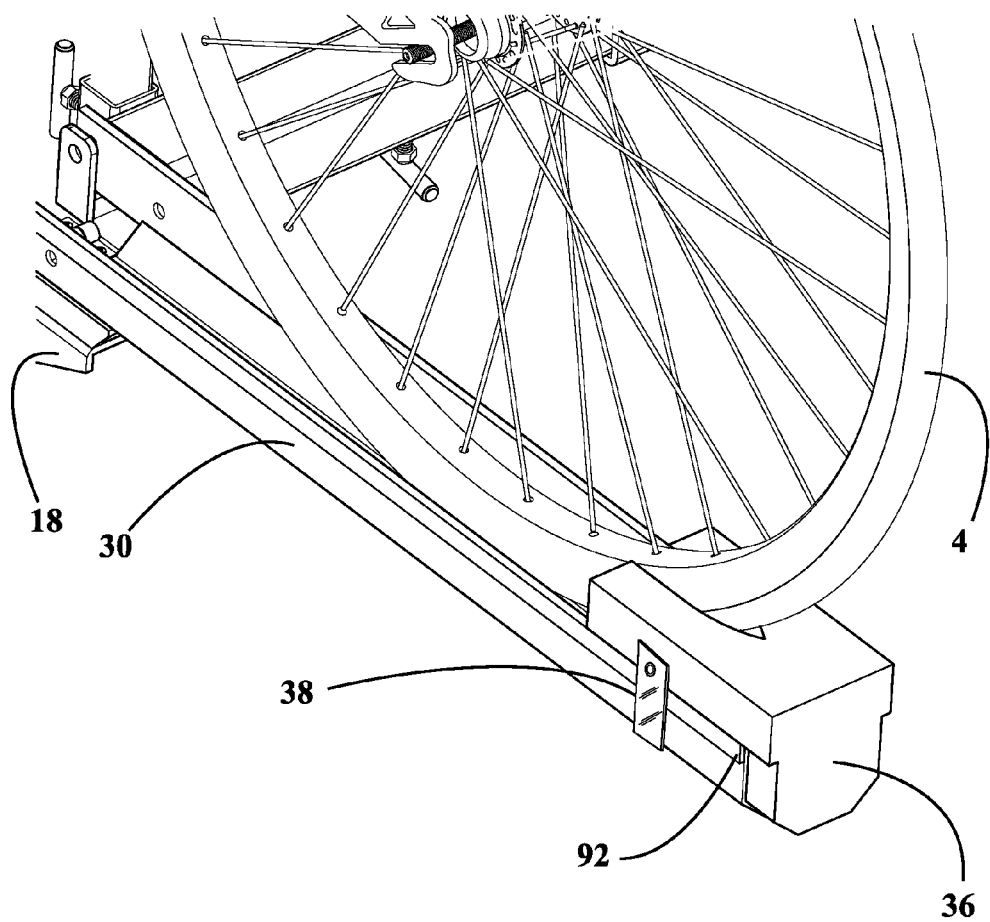
FIG. 11 is an end-side perspective view of a chock and rail member of the bicycle rack designed for carrying at least two bicycles, according to the second embodiment of the invention.
Figure 12:
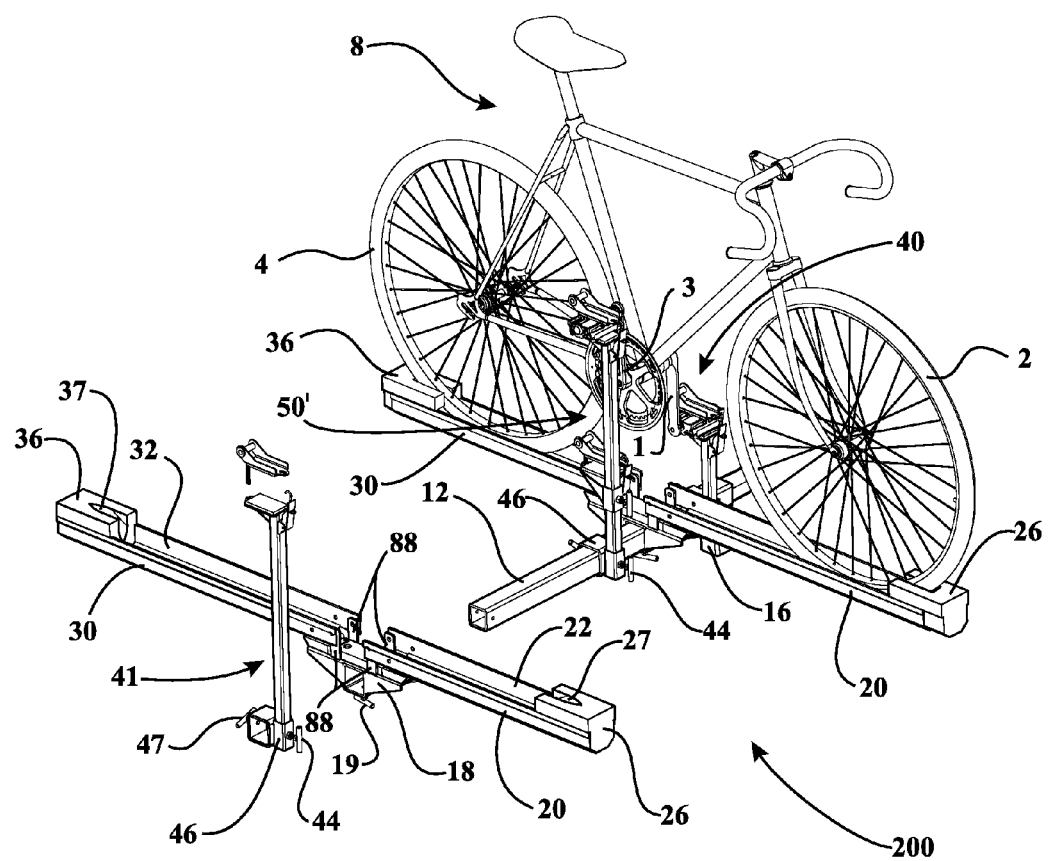
FIG. 12 is a partially exploded perspective view of the bicycle rack designed for carrying at least two bicycles, according to the second embodiment of the invention.

As shown in the illustrated embodiment of FIG. 1, the bicycle rack 100 further comprises a pair of chock members 26, 36. A bottom portion of the first chock member 26 is received within the elongate groove 22 of the first rail member 20, while a bottom portion of the second chock member 36 is received within the elongate groove 32 of the second rail member 30. The chock members 26, 36 are configured to stabilize the respective first and second wheels 2, 4 of the bicycle 8 in the respective first and second rail members 20, 30. As best shown in FIGS. 12 and 13, the first chock member 26 is provided with a wheel notch 27 for receiving the first wheel 2 of the bicycle 8, while the second chock member 36 is provided with a wheel notch 37 for receiving the second wheel 4 of the bicycle 8. As shown in FIG. 1, each of the chock members 26, 36 is secured to its respective rail member 20, 30 by a respective strap member 28, 38. In one or more embodiments, the strap members 28, 38 are adjustably coupled to the respective rail members 20, 30 so that the positions of the chock members 26, 36 along the lengths of the rail members 20, 30 may be varied. For example, in an exemplary embodiment, the strap members 28, 38 could each engage a respective gear rack on the bottom of the respective rail members 20, 30. In such an arrangement, each strap members 28, 38 could comprise a knob for tightening and loosening its engagement with its respective rail member 20, 30. The knob could be turned one direction (e.g., clockwise) for tightening the strap member 28, 38 against the rail member 20, 30, and another direction (e.g., counter-clockwise), for loosening the strap member 28, 38 so as to allow the repositioning of the chock member 26, 36 to fit various bicycles. In FIG. 11, a chock member 36 is illustrated in conjunction with the second embodiment of the invention. The bicycle wheel chocks 26, 36 are designed to be removable from the rail members 20, 30 (i.e., they are formed as removable inserts).

In one or more embodiments, the illustrated bicycle wheel chocks 26, 36 are formed from foam and/or rubber. The foam can be cut or molded to fit typical bicycle tire widths and to engage with the elongate grooves 22, 32 in the respective rail members 20, 30. The bicycle wheel chocks 26, 36 help to prevent the bicycle tires from moving side-to-side while in transit. The requisite width of the bicycle tire groove 27, 37 in the chocks 26, 36 is determined by common bicycle tire widths.

Figure 4:
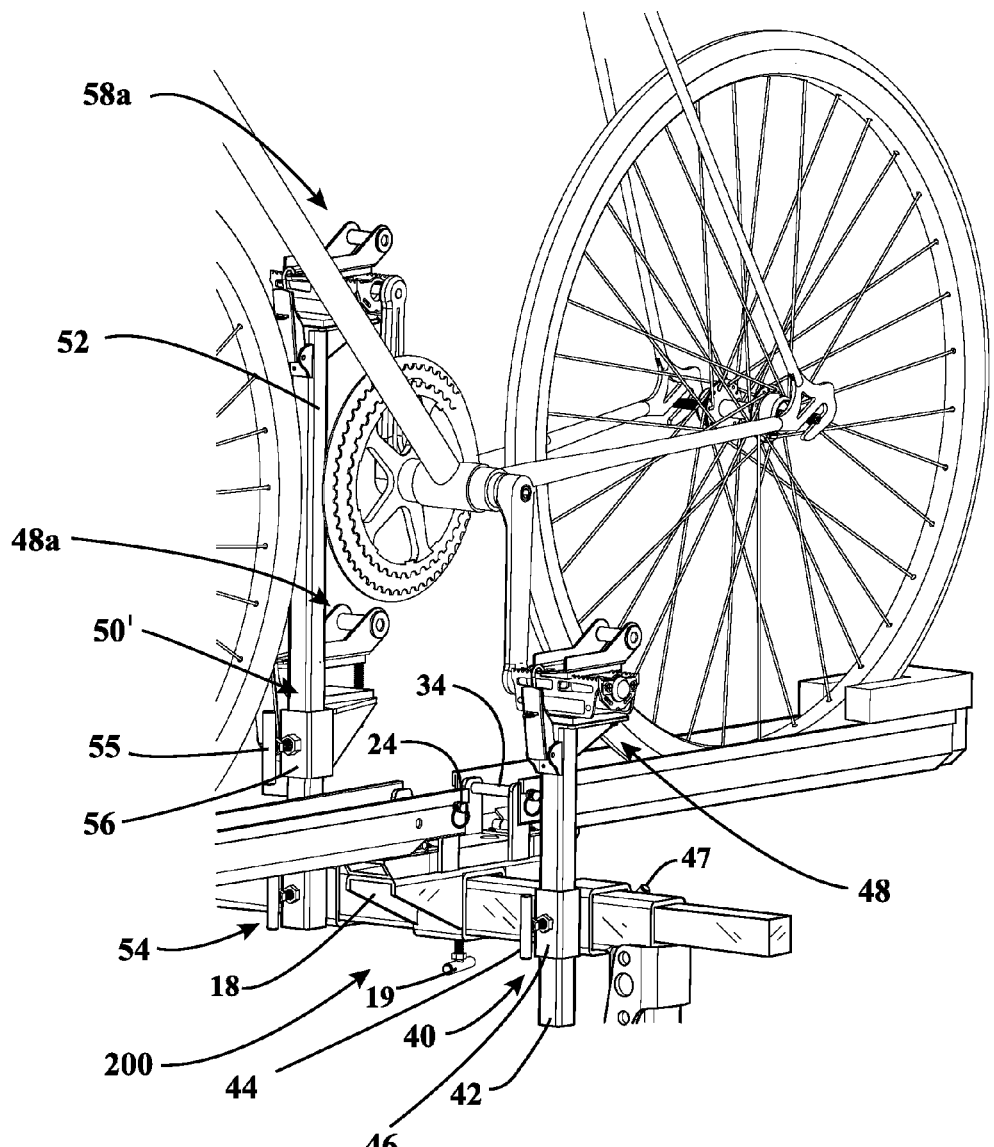
FIG. 4 is one partial side perspective view of a bicycle rack designed for carrying at least two bicycles in a generally parallel arrangement, according to a second embodiment of the invention.

Next, referring to FIGS. 1-5, 9, 10A, 10B, 12, and 13, the structure of the pedal support assemblies 40, 41, 50, 50' will be described. Initially, with reference to FIGS. 1-4, 12, and 13, it can be seen that each pedal support assembly 40, 41, 50, 50' comprises a respective adjustable upright support member 42, 52, 53 and one or more clamping subassemblies 48, 48a, 58, 58a (i.e., lower pedal clamping assemblies 48, 48a and upper pedal clamping assembly 58, 58a). As shown in FIG. 4, the height of upright support member 42, 52 is adjustable by means of a respective height adjustment handle 44, 54. That is, if the user wants to adjust the height of either upright support member 42 or 52 to accommodate the pedal arrangement on a particular bicycle, he or she simply turns either the height adjustment handle 44 or 54 in its loosening direction (e.g., counter-clockwise). Once the end of the threaded handle shaft coupled to height adjustment handle 44 or 54 is disengaged from the upright support member 42, 52, the upright support member 42, 52 is free to be displaced longitudinally within the first collar portion of its collar bracket member 46 (i.e., the first collar portion of the collar bracket member 46 has a vertically disposed passageway for slidingly receiving the upright support member 42, 52). After the upright support member 42, 52 is appropriately positioned at the requisite height, the height adjustment handle 44 or 54 is turned in its tightening direction (e.g., clockwise) so as to reengage the end of the threaded handle shaft coupled to height adjustment handle 44 or 54 with the upright support member 42, 52, thereby fixing the height of the upright support member 42, 52. The upright support member 42, 52 (i.e., column-like members) can be in the form of tubular members (e.g., formed from steel tubes). As will be described hereinafter, in some embodiments, each of the pedal support assemblies 40, 41, 50, 50' is configured to engage a standard shoe cleat locking mechanism on a bicycle pedal. In some embodiments, a lever may be provided as a means to rotate the clamping subassembly and disengage the bicycle pedal therefrom (e.g., the clamping subassembly could be rotated approximately 15 degrees to disengage the bicycle pedal therefrom).

Figure 14:
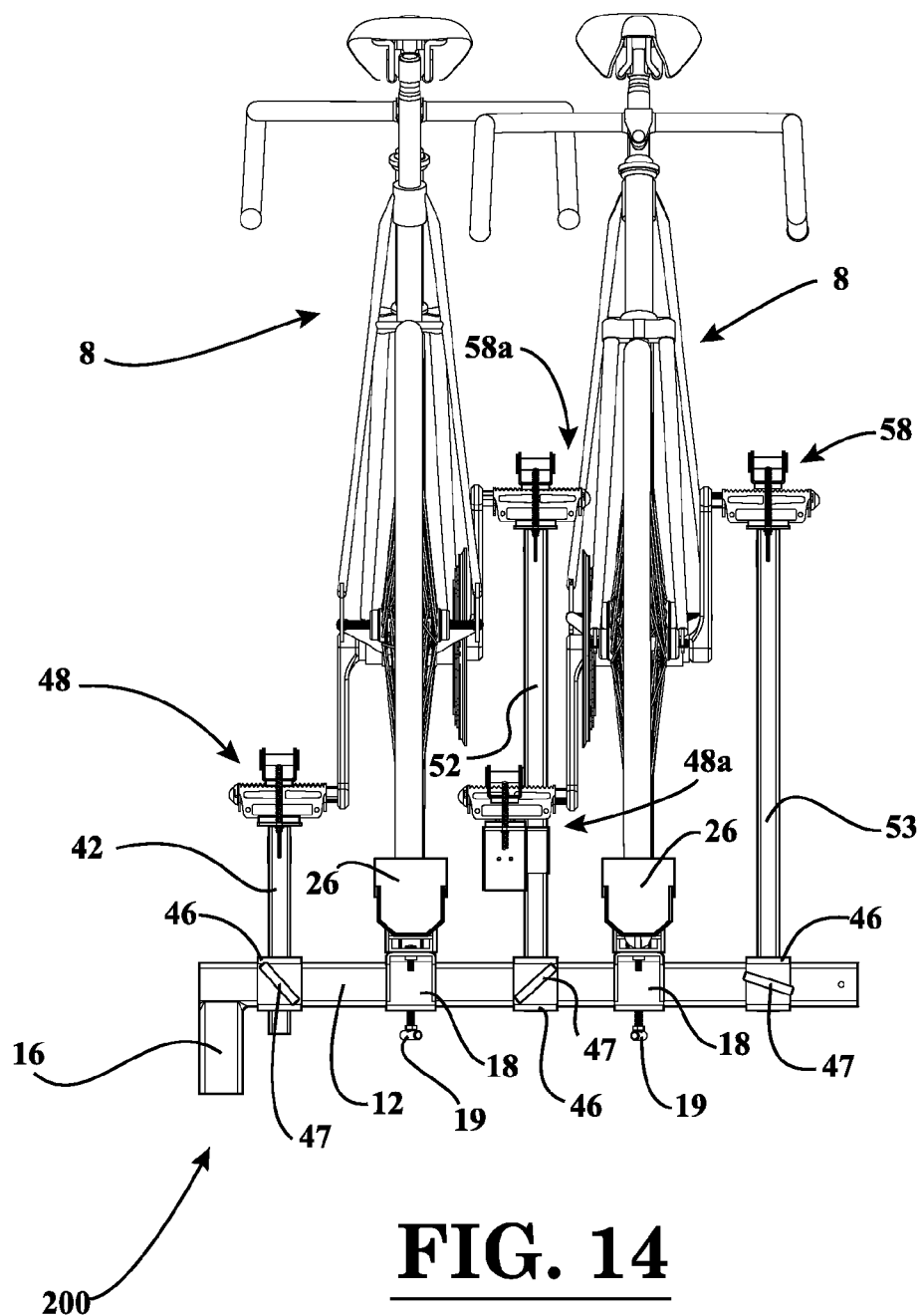
FIG. 14 is an end view of the bicycle rack designed for carrying at least two bicycles, according to the second embodiment of the invention.

Primarily, with reference to FIGS. 12 and 13, the structural configuration of the collar bracket members 46 of each pedal support assembly 40, 41, 50, 50' will be described. As described above, each collar bracket member 46 comprises a first collar portion with a generally vertically disposed passageway for slidingly receiving the upright support member 42, 52 and a height adjustment handle 44, 54. In addition, each collar bracket member 46 comprises a larger second collar portion with a generally horizontally disposed passageway for slidingly receiving the trailer hitch mounting bar 12. The horizontal passageway of the second collar portion is disposed generally perpendicular or perpendicular to the vertical passageway of the first collar portion. Also, as shown in FIGS. 12 and 14, the lateral position of each pedal support assembly 40, 41, 50, 50' on the trailer hitch mounting bar 12 is adjustable by means of a respective lateral adjustment handle 47. That is, if the user wants to adjust the lateral position of any of the pedal support assemblies 40, 41, 50, 50' on the trailer hitch mounting bar 12 to accommodate the pedal arrangement on a particular bicycle (e.g., a particular lateral pedal spacing), he or she simply turns the lateral adjustment handle 47 in its loosening direction (e.g., counter-clockwise). Once the end of the threaded handle shaft coupled to lateral adjustment handle 47 is disengaged from the side of the trailer hitch mounting bar 12, the pedal support assembly 40, 41, 50, 50' is free to be displaced along the length of the trailer hitch mounting bar 12. After the pedal support assembly 40, 41, 50, 50' is appropriately positioned on the trailer hitch mounting bar 12, the lateral adjustment handle 47 is turned in its tightening direction (e.g., clockwise) so as to reengage the end of the threaded handle shaft coupled to lateral adjustment handle 47 with the side of the trailer hitch mounting bar 12, thereby fixing the position of the pedal support assembly 40, 41, 50, 50' relative to the trailer hitch mounting bar 12.

Figure 17:
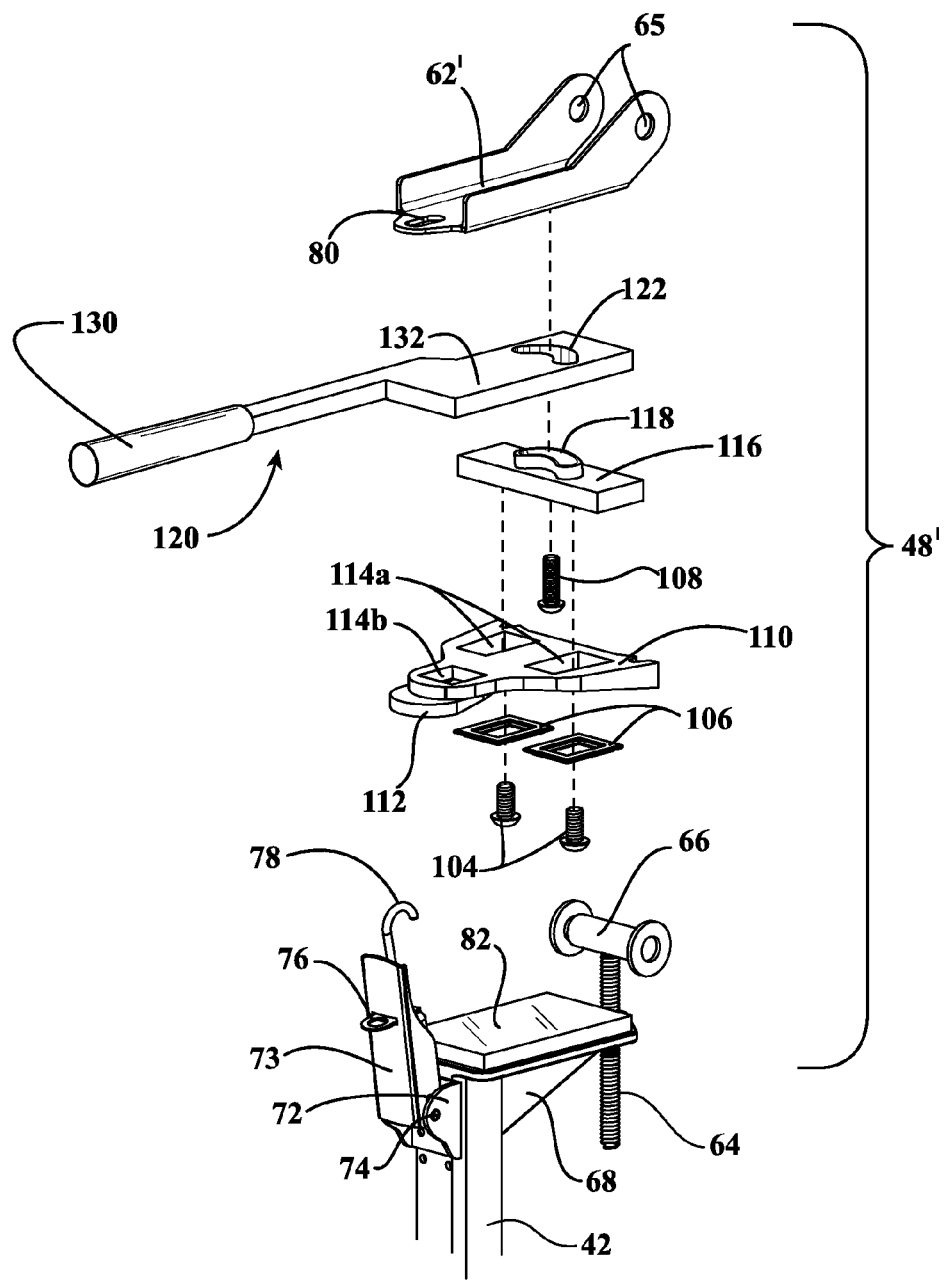
FIG. 17 is an exploded perspective view illustrating an alternative design for the pedal clamping subassemblies of the bicycle rack of the embodiments herein, wherein the pedal clamping subassembly is configured to engage with a shoe cleat locking mechanism on the bicycle pedal.

Next, the structural features of the clamping subassemblies 48, 48a, 58, 58a of the pedal support assemblies 40, 41, 50, 50' will be explained. The clamping subassemblies 48, 48a, 58, 58a used in each of the pedal support assemblies 40, 41, 50, 50' are generally the same. The structural aspects of the clamping subassemblies will be described primarily with reference to FIGS. 2-4, 9, 10A, and 10B. Initially, referring to FIGS. 2 and 3, it can be seen that each clamping subassembly 48, 58 comprises a lower clamping plate 60 and an upper clamping plate 62. A first pedal 5 of the bicycle 8, which is rotatably coupled to first bicycle crank arm 1, is configured to be sandwiched between the lower clamping plate 60 and the upper clamping plate 62 of the first clamping subassembly 48, while a second pedal 7 of the bicycle 8, which is rotatably coupled to second bicycle crank arm 3, is configured to be sandwiched between the lower clamping plate 60 and the upper clamping plate 62 of the second clamping subassembly 58. In FIGS. 2 and 3, it can be seen that each clamping subassembly 48, 58 further comprises a threaded clamping rod 64 and a height-adjustable pivot pin 66. As best shown in FIG. 2, the threaded clamping rod 64 has a first end 64a and a second end 64b, which is disposed opposite to the first end 64a. The first end 64a of the threaded clamping rod 64 engages a plurality of internal threads in a threaded aperture 61 of the lower clamping plate 60 and/or a threaded weld nut 63 attached to the lower clamping plate 60. The second end 64b of the threaded clamping rod 64 is operatively coupled to the height-adjustable pivot pin 66. The upper clamping plate 62 is configured to rotate about the height-adjustable pivot pin 66 so as to allow the pedal 5, 7 to be clamped into place. In particular, as best shown in FIG. 17, the pair of oppositely disposed, diagonally extending wings on the rear end of the upper clamping plate 62 are each provided with a respective circular aperture 65 disposed therein for receiving a respective end of the pivot pin 66. Advantageously, by means of the threaded clamping rod 64, the force of each clamping subassembly 48, 58 is adjustable for different thicknesses and styles of bicycle pedals. The height of the pivot pin 66 relative to the lower clamping plate 60 can be adjusted by rotating the threaded clamping rod 64 within the threaded aperture 61 of the lower clamping plate 60 and/or a threaded weld nut 63, which in turn, raises or lowers the pivot pin 66 depending upon the direction of the rotation of the threaded clamping rod 64. As such, the threaded clamping rod 64, together with the height-adjustable pivot pin 66, allows the pedal accommodation height and clamping pressure of each clamping subassembly 48, 48a, 58, 58a to be adjusted.

Figure 10A:
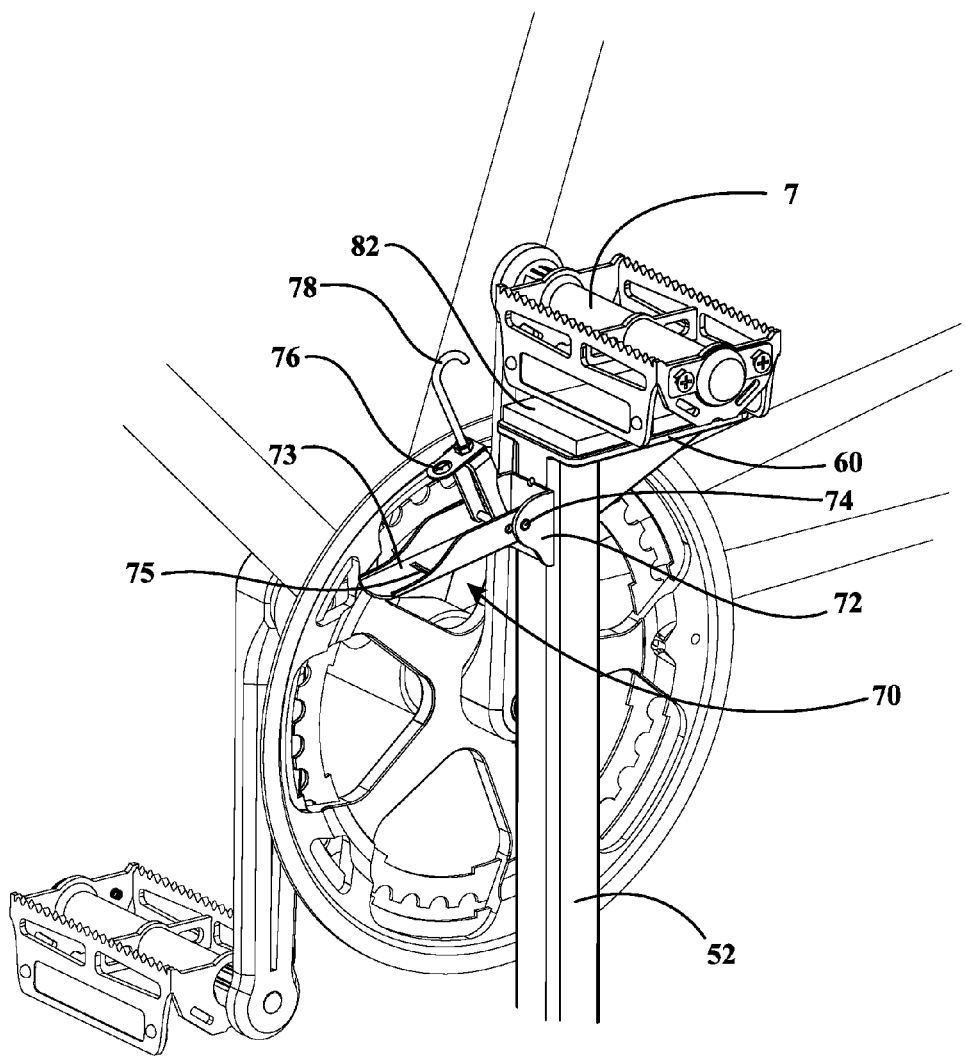
FIG. 10A is another front end-side perspective view of a pedal clamping subassembly of the bicycle rack designed for carrying at least two bicycles, according to the second embodiment of the invention, wherein the pedal clamping subassembly is shown in the open, unlatched position.
Figure 10B:
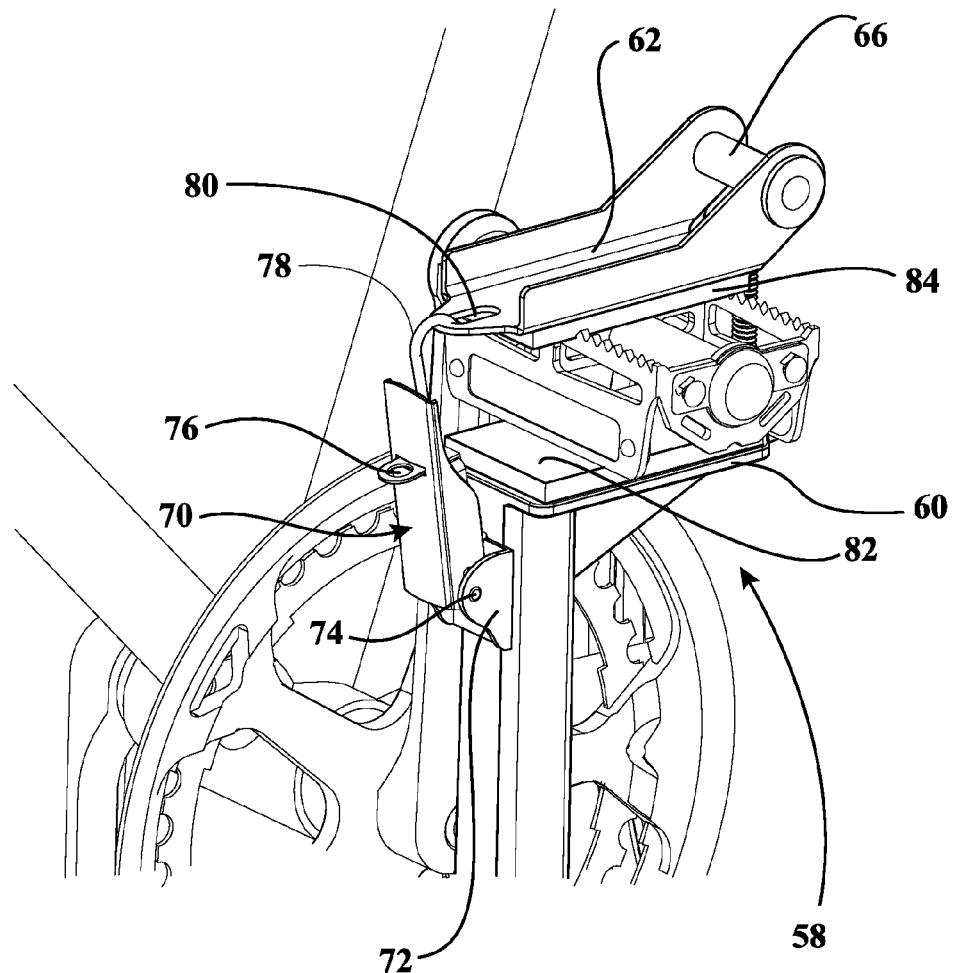
FIG. 10B is yet another front end-side perspective view of a pedal clamping subassembly of the bicycle rack designed for carrying at least two bicycles, according to the second embodiment of the invention, wherein the pedal clamping subassembly is shown in the closed, latched position.

Turning again to FIGS. 2 and 3, it can be seen that the clamping subassembly 48, 58 further comprises a gusset-style support bracket 68 that supports the lower clamping plate 60 in a cantilevered manner from the upright support member 42, 52, and a pivotable clamping latch member 70 that latches the upper clamp plate 62 in place over the pedal 5, 7. The pivotable clamping latch member 70 is rotatably coupled to the upright support member 42, 52 by means of mounting bracket 72 and pin 74. Also, as shown in FIG. 3, the pivotable clamping latch member 70 includes a lock eye 76 for receiving a shackle portion 128 of a padlock 126 so that the clamping subassembly 48, 48', 58 can be securely locked (e.g., to prevent theft of the bicycle 8 while disposed in the bicycle rack 100—see FIG. 19). In FIG. 3, it can be seen that the top end of the latch member 70 contains a latch hook member 78 that engages an aperture 80 in the upper clamping plate 62 so as to retain the upper clamping plate 62 in place in a latched position. Advantageously, the latch hook member 78 is adjustable for different bicycle pedal styles by rotating the latch hook member 78 relative to its base frame (see FIG. 10A). FIG. 10A illustrates the clamping subassembly in its open, unlatched position, while FIG. 10B illustrates the clamping subassembly in its closed, latched position. As best shown in FIG. 10A, each pedal latching subassembly further comprises a pivotable hook cover member 73 with a lock eye slot 75 disposed therein for accommodating the passage of the lock eye 76 of the pivotable clamping latch member 70 through the cover member 73 when the clamping subassembly is in its closed, latched position (i.e., FIG. 10B position). In FIG. 10A, it can be seen that, in the open, unlatched position of the pedal clamping subassembly, pivotable hook cover member 73 rotates to a position approximately 90 degrees from its latched position, whereas the latch hook member 78 rotates to a position approximately 20 to 45 degrees, inclusive, from its latched position. As such, the latch hook member 78 can be easily latched in place first within the aperture 80 of the upper clamping plate 62. Then, the pivotable hook cover member 73 can be subsequently rotated in place over the top of the latch hook member 78 so as to conceal a majority of the latch hook member 78. After which, the pedal latching subassembly of each pedal 5, 7 can be secured using a padlock 126 (see FIG. 19).

Referring again to FIGS. 2 and 3, it can be seen that each clamping subassembly 48, 58 further comprises a lower compression pad 82 and an upper compression pad 84. The lower compression pad 82 is coupled to the lower clamping plate 60 of each clamping subassembly 48, 48a, 58, 58a and the upper compression pad 84 is coupled to the upper clamping plate 62 of each clamping subassembly 48, 48a, 58, 58a. The upper and lower compression pads 82, 84 are configured to be sandwiched between respective ones of the first and second pedals 5, 7 of the bicycle 8 and a respective one of the upper and lower clamping plates 60, 62. In one or more embodiments, the upper and lower compression pads 82, 84 are in the form of medium density rubber pads (e.g., made from neoprene or foam).

Figure 16:
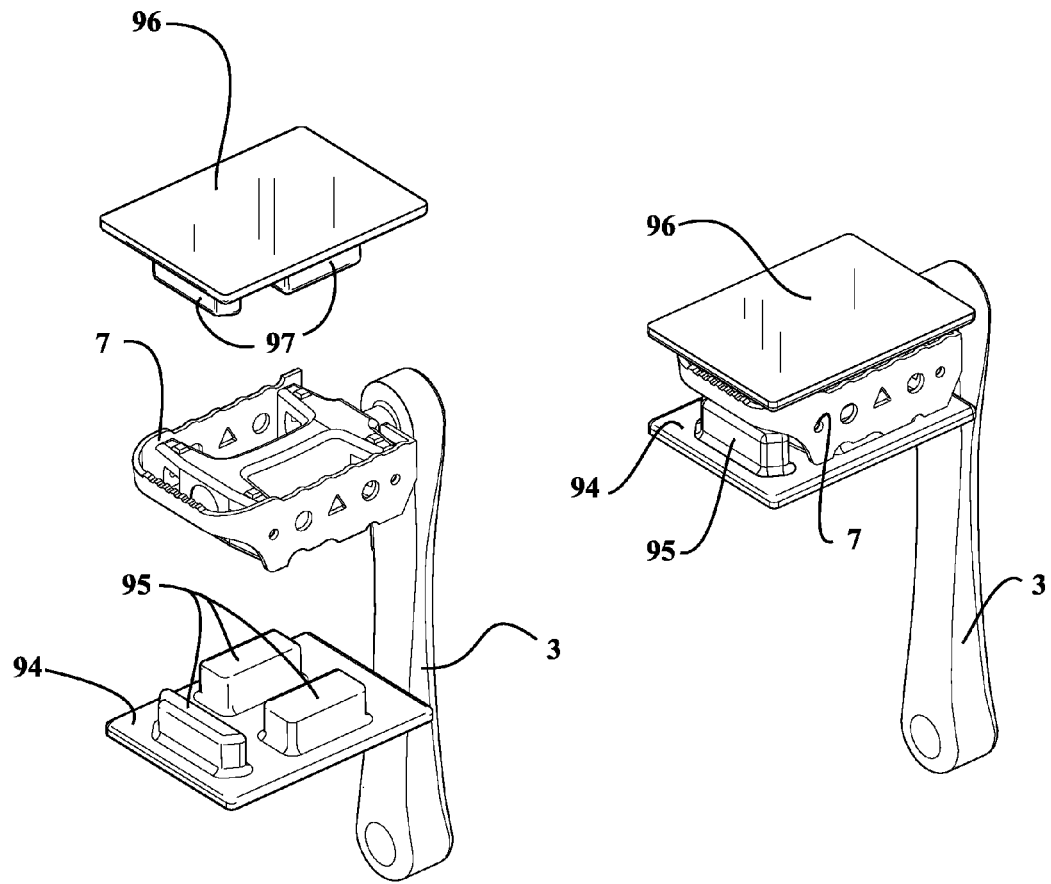
FIG. 16A is an exploded perspective view illustrating customized pedal insert members that may be utilized in conjunction with the embodiments of the bicycle rack described herein.
FIG. 16B is a perspective view illustrating the customized pedal insert members of FIG. 16A engaged with a bicycle pedal.

As an alternative to, in addition to the upper and lower compression pads 82, 84, each clamping subassembly 48,

48a, 58, 58a may be provided with a pair of customized pedal insert members 94, 96 that are designed to engage with the apertures in specific pedal styles. As shown in FIGS. 16A and 16B, a lower customized pedal insert member 94 with spaced-apart upwardly protruding portions 95 (or insert block portions 95) and an upper customized pedal insert member 96 with spaced-apart downwardly protruding portions 97 (or insert block portions 97) may be provided below and above the pedal member 7, respectively. As shown in FIG. 16B, the pedal 7 is sandwiched between the lower and upper customized pedal insert members 94, 96. The spaced-apart protruding portions or block portions 95, 97 of each customized pedal insert member 94, 96 are designed to engage with the specific apertures within the pedal 7. It is to be understood that the configuration and layout of the spaced-apart protruding portions or block portions 95, 97 of the pedal insert members 94, 96 can be customized for any pedal design that is utilized in a particular bicycle. Advantageously, by being customized for the particular geometry of a specific bicycle pedal 5, 7, the customized pedal insert members 94, 96 enhance the gripping contact force of each clamping subassembly 48, 48a, 58, 58a on the respective bicycle pedals 5, 7, thereby resulting in a very solid and stable clamping assembly.

Figure 18:
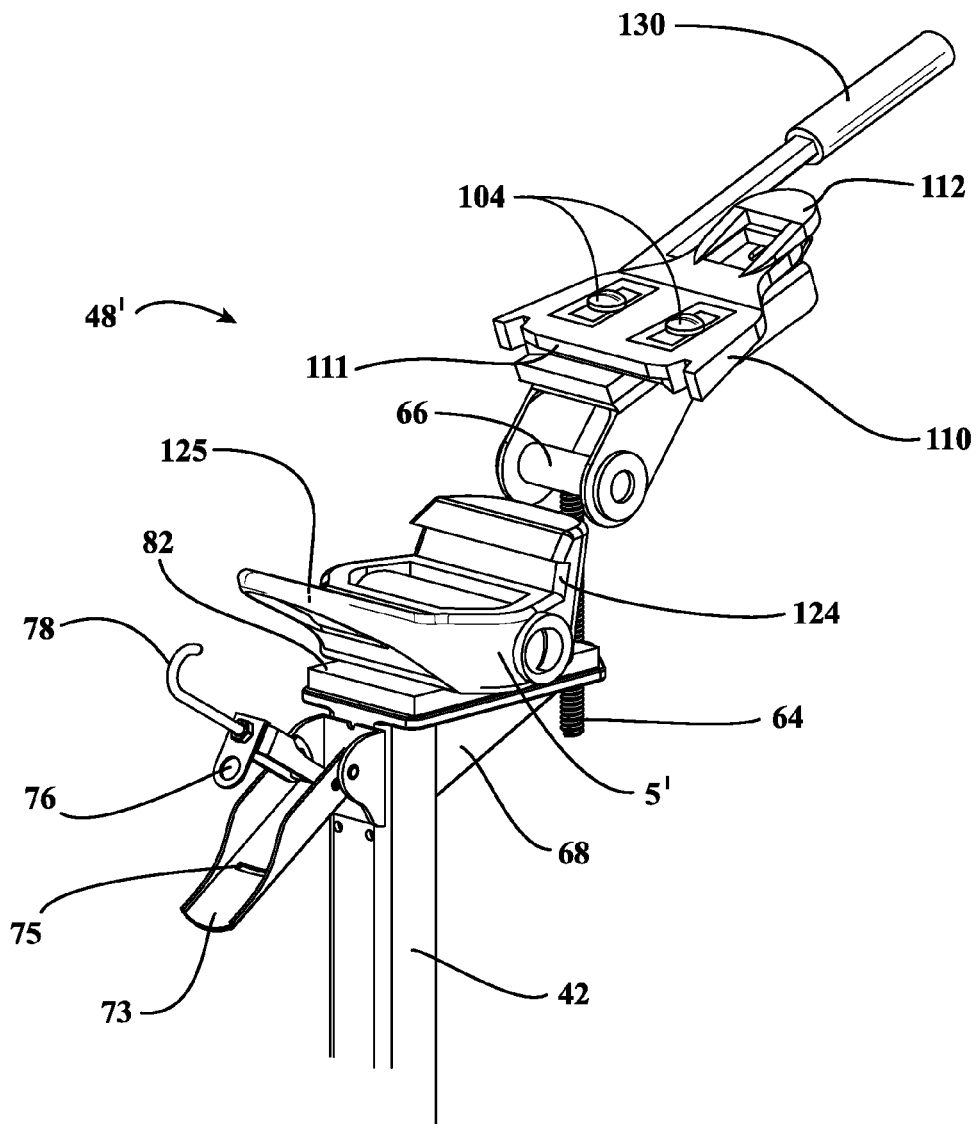
FIG. 18 is a perspective view illustrating the alternative pedal clamping subassembly of FIG. 17, wherein a bicycle pedal with a shoe cleat locking mechanism thereon is shown in an open, unlatched pedal clamping subassembly.
Figure 19:
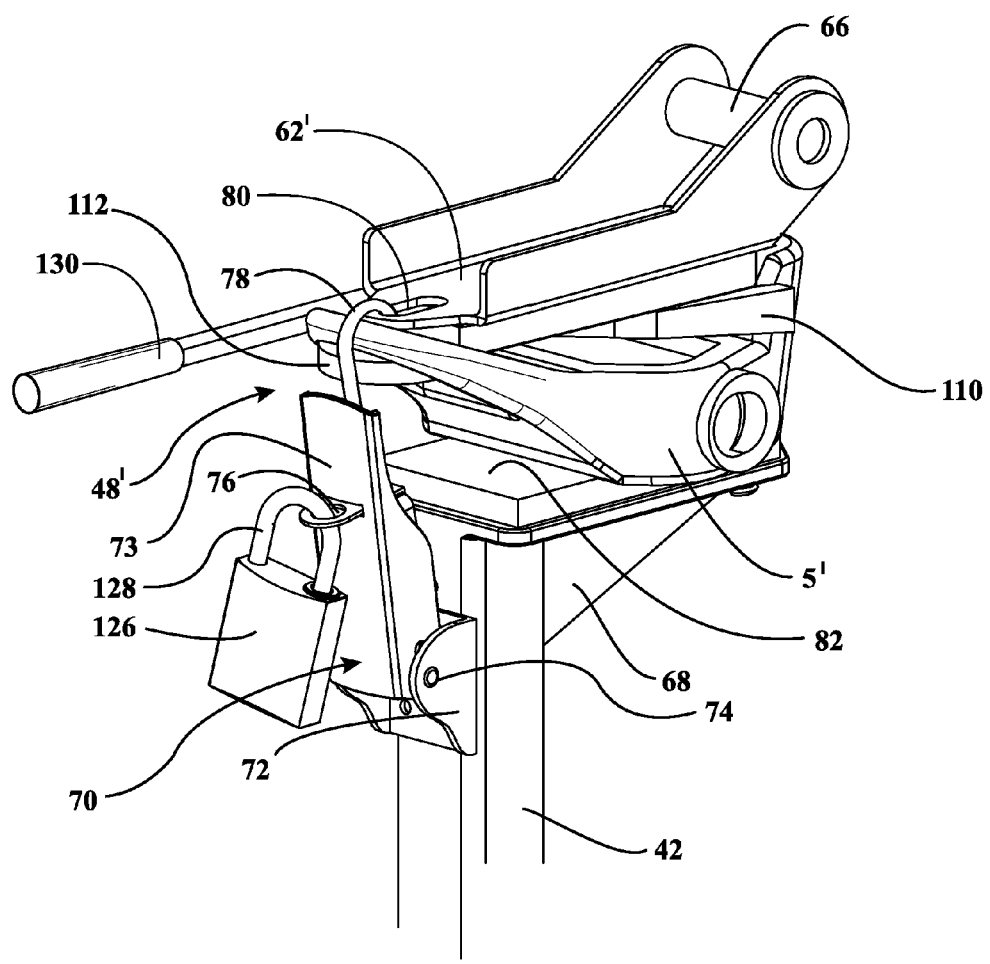
FIG. 19 is a perspective view illustrating the alternative pedal clamping subassembly of FIGS. 17 and 18, wherein the bicycle pedal with the shoe cleat locking mechanism thereon is shown in a closed, latched pedal clamping subassembly.

An alternative embodiment of a clamping subassembly 48' is illustrated in FIGS. 17-19. The clamping subassembly 48' that is illustrated in these figures is particularly designed to engage with a bicycle pedal 5' having a shoe locking cleat. That is, the bicycle pedal 5' of FIGS. 17-19 is structurally configured so as to lockingly engage a shoe of the bicycle rider so that the rider's foot does not inadvertently slip off the pedal 5' while riding. Shoe locking cleats are especially important on high performance bicycles, which are often used by riders travelling at high speeds (e.g., during a bicycle race or competition). Initially, referring to the exploded view of FIG. 17, it can be seen that clamping subassembly 48' comprises many of the same components as the clamping subassembly 48, 48a, 58, 58a described above, except that the clamping subassembly 48' also comprises additional components that allow it to interlockingly engage with the shoe locking cleat on the pedal 5'. As shown in FIG. 17, the clamping subassembly 48' additionally includes a shoe clip 110 that fits within, and locks directly to the pedal 5'. The shoe clip 110 comprises a rear projection 111 (see FIG. 18), a front tongue portion 112, and a plurality of apertures 114a, 114b disposed therein. As best shown in FIG. 18, the rear projection 111 of the shoe clip 110 engages with the rear pedal notch or slot 124 of the pedal 5', while the front tongue portion 112 of the shoe clip 110 engages with the front pedal aperture 125 of the pedal 5' (i.e., the front tongue portion 112 slips into the front pedal aperture 125—see FIG. 19). By virtue of the engagement of the rear projection 111 of the shoe clip 110 with the rear pedal notch or slot 124 of the pedal 5' and the engagement of the front tongue portion 112 of the shoe clip 110 with the front pedal aperture 125 of the pedal 5', the shoe clip 110 of the clamping subassembly 48' is securely interlocked with the pedal 5'. In some embodiments, the rear projection 111 of the shoe clip 110 is spring-loaded so as to allow the shoe clip 110 to snap into place within the pedal 5'.

Turning again to FIG. 17, the release mechanism of the locking cleat clamping subassembly 48' will now be explained. As best shown in this figure, the clamping subassembly 48' also includes small fastener members 104 (i.e., small screws 104), rectangular ring-shaped members 106, large fastener member 108 (i.e., large screw 108), adapter plate member 116 with curved slot boss 118, and locking cleat release handle 120. In FIG. 17, it can be seen that the locking cleat release handle 120 comprises a handle portion 130 and a plate portion 132. The plate portion of the locking cleat release handle 120 comprises a curved slot 122 disposed therethrough. The small screws 104 pass through the apertures of rectangular ring-shaped members 106, and through the rear apertures 114a of shoe clip 110, and then threadingly engage the bottom surface of the adapter plate 116. As such, by means of the small screws 104, the rectangular ring-shaped members 106 are secured to the underside of shoe clip 110, and are aligned with rear apertures 114a of shoe clip 110. The large screw 108 passes through the curved slot boss 118 of the adapter plate member 116, passes through the curved slot 122 in the plate portion 132 of the locking cleat release handle 120, and then threadingly engages the bottom surface of the upper clamp plate 62'. By attaching them together, the small screws 104 allow the components 110, 116, and 120 to laterally pivot together as an assembly relative to the upper clamp plate 62' (the upper clamp plate 62' does not pivot with the components 110, 116, and 120). When a user laterally rotates/displaces the handle portion 130 of the locking cleat release handle 120 (i.e., about a central axis passing through the center of the screw 108), the shoe clip 110 is released from engagement with the pedal 5'.

In one or more embodiments, the user of the bicycle rack 100, 200 may purchase an extra set of plastic shoe clips 110 that fit his or her cycling shoes, and use them in conjunction with the clamping subassembly 48' (by screwing it into place with screws 104 and 108). As such, the clamping subassembly 48' could be customized with a particular type of shoe clip 110.

In one or more embodiments, the bicycle 8 on the bicycle rack 100 is configured to be mounted in at least one of the following locations: (i) proximate to the rear bumper of a vehicle; and (ii) on the roof of a vehicle. For example, when mounted on the roof of a vehicle (e.g., on the roof of large trucks or motor homes), a hexagonal mounting tube could be used as a part of the central support assembly 10 of the bicycle rack 100. In one roof-mounted version of the rack, diagonal support members could extend from diagonal facets on opposite sides of the hexagonal mounting tube to a bottom surface of a rail member of the bicycle rack 100. As such, in this version of the roof-mounted rack, the bicycles 8 would be oriented in an angled relationship on the roof of the vehicle. In another roof-mounted version of the rack, the rail members 20, 30 of two bicycle racks 100 could be mounted proximate to, and generally parallel to, respective facets on the hexagonal mounting tube, and the first and second pedal support assemblies 40, 50 (i.e., pedal mounts) could be disposed generally perpendicular to the facet surfaces of the hexagonal mounting tube. Advantageously, the latter roof-mounted version of the bicycle rack would enable the bicycles to be more easily loaded and unloaded from the rack. It would also reduce the overall height of the bicycle rack assembly and the bicycles disposed thereon.

Figure 15:
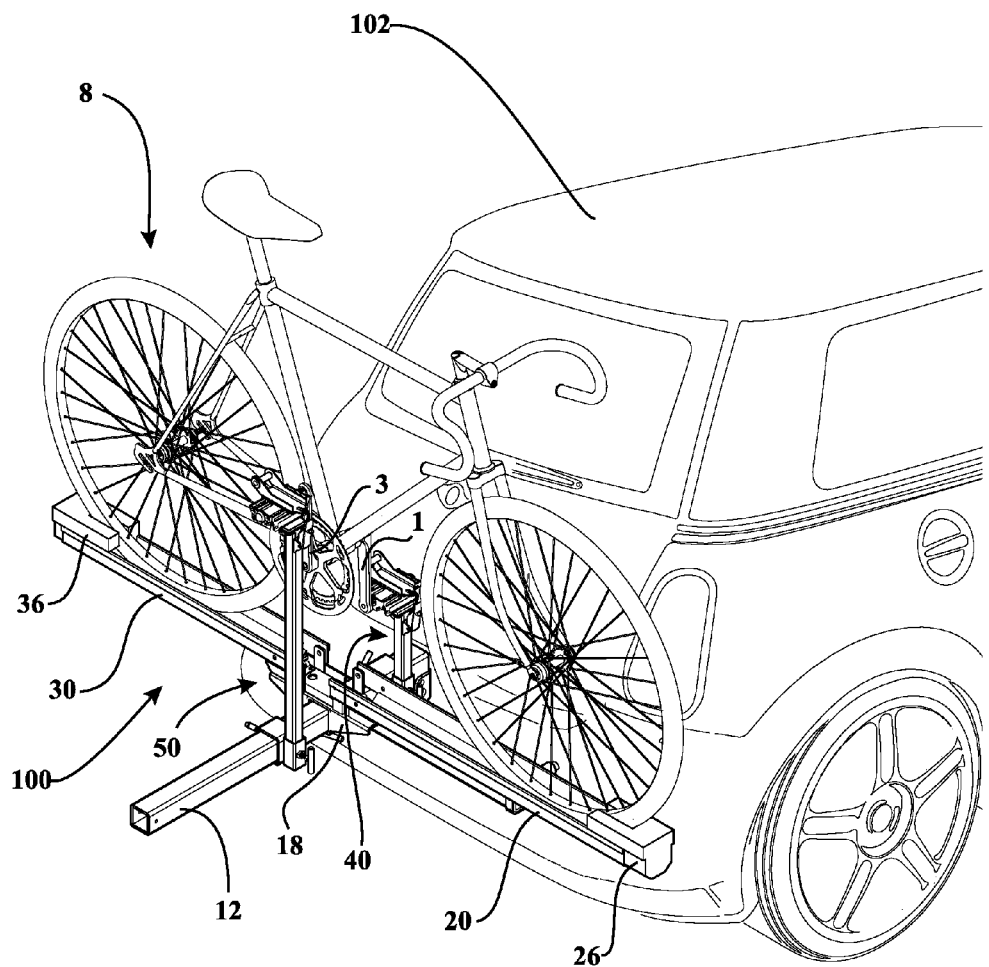
FIG. 15 is a perspective view of the bicycle rack of the embodiments herein attached to the rear of a vehicle, wherein the bicycle rack is shown carrying a single bicycle.

In FIG. 15, the bicycle rack 100 is mounted proximate to the rear bumper of a vehicle 102. In the illustrated embodiment of FIG. 15, the vertical support post member 16 of the central support assembly 10 of the bicycle rack 100 is secured to a vertical bracket member centrally disposed on a vertical-style trailer hitch 15 (i.e., the vertical-style trailer hitch 15 illustrated FIG. 13). However, it is to be understood that the central support assembly 10 of the bicycle rack 100 could be alternatively connected to the horizontal-style trailer hitch receiver 14 of FIG. 13. Also, while only a single bicycle is supported on the bicycle rack 100 of FIG. 15, it is to be understood that bicycle rack could be easily adapted to carry a plurality of bicycles, as described above.

Figure 5:
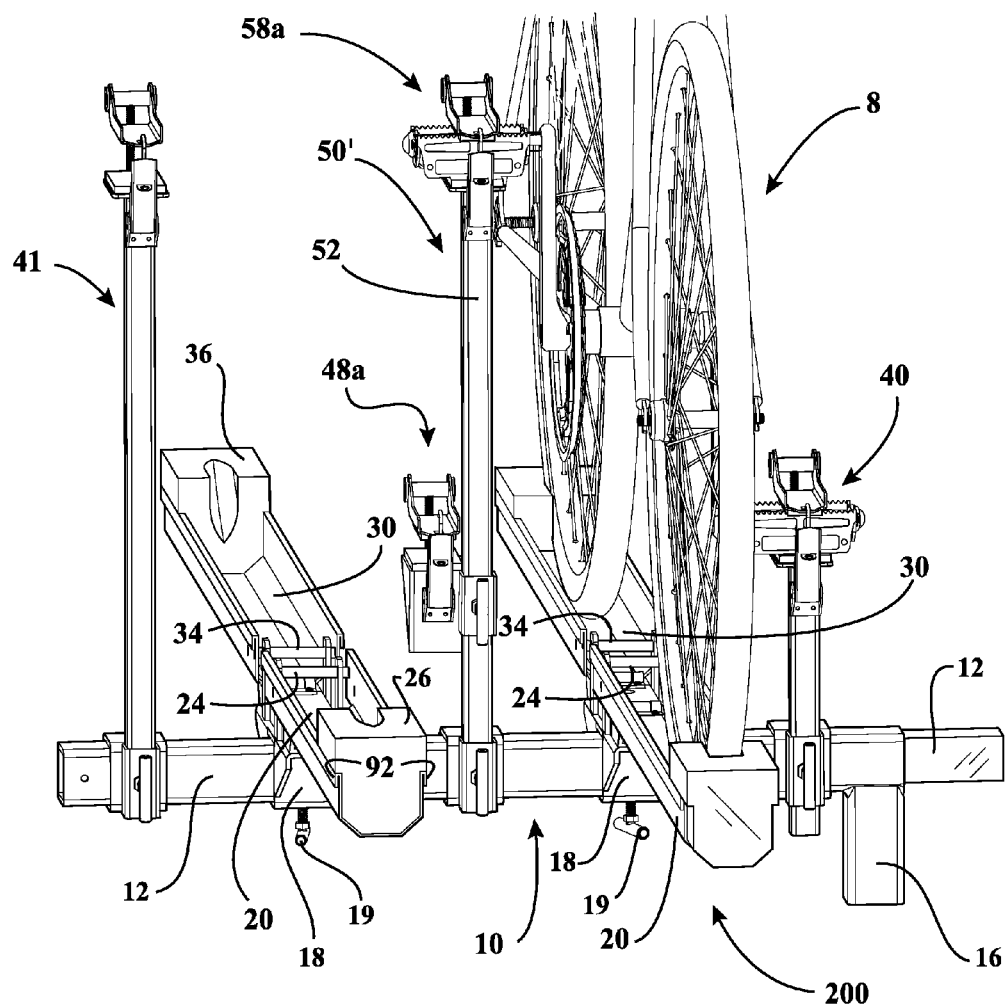
FIG. 5 is an end perspective view of the bicycle rack designed for carrying at least two bicycles, according to the second embodiment of the invention, wherein both sets of rail members are in a folded-down position.
Figure 6:
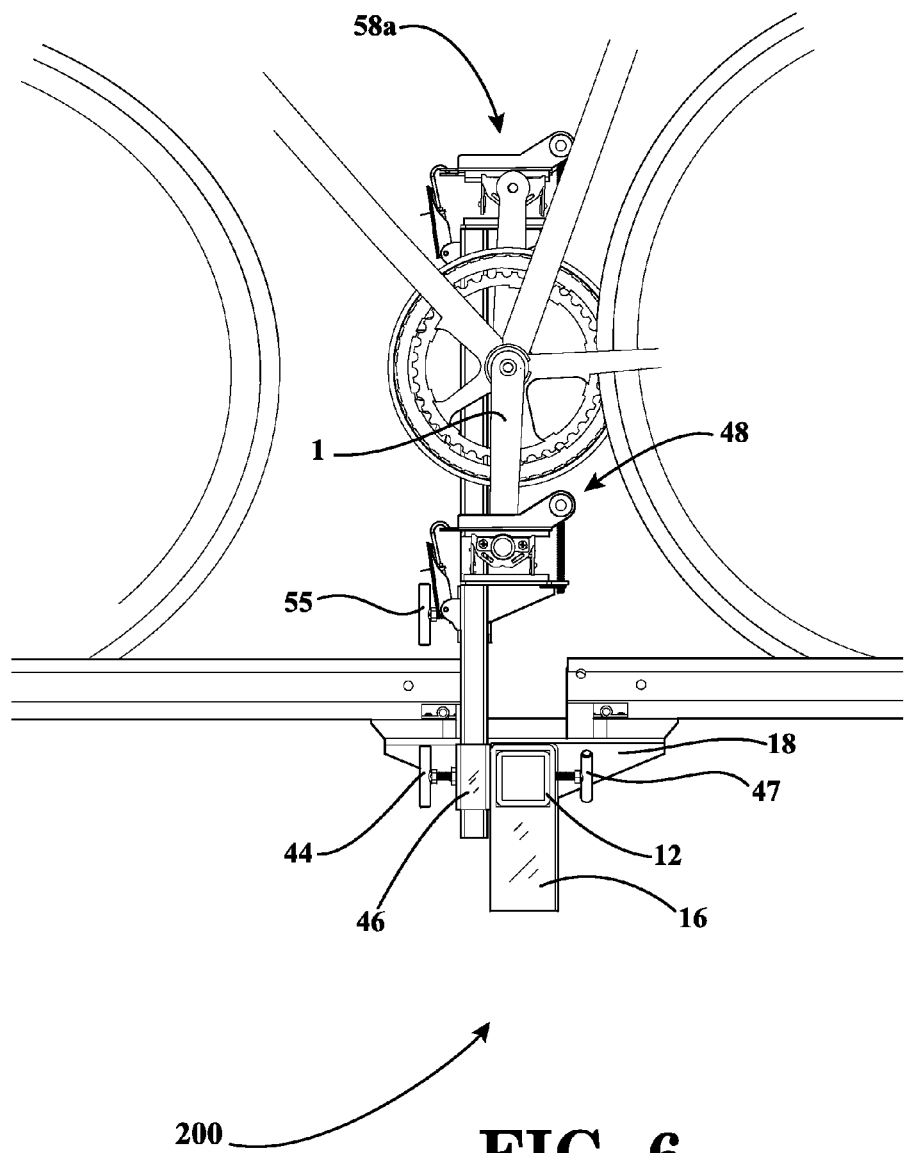
FIG. 6 is an enlarged perspective view of a central portion of the bicycle rack designed for carrying at least two bicycles, according to the second embodiment of the invention.

A second embodiment of the bicycle rack is seen generally at 200 in FIGS. 4-14. The bicycle rack 200 is similar in most respects to the bicycle rack 100 described above. Moreover, many elements are common to both such embodiments. For the sake of brevity, the elements that the second embodiment of the bicycle rack 200 has in common with the first embodiment will not be discussed because these components have already been explained in detail above. Although unlike the bicycle rack 100 of the first embodiment, the bicycle rack 200 of the second embodiment comprises two sets of rail members 20, 30 and pedal support assemblies 40, 41, 50' that are mounted on a common central support assembly 10 so that two bicycles 8 are capable of being transported by a vehicle using the bicycle rack 200 (e.g., refer to FIGS. 5 and 14). In FIGS. 5 and 12-14, it can be seen that each of the two sets of rail members 20, 30 are disposed in a generally parallel relationship to one another (i.e., when both sets of rail members 20, 30 are either in their folded-down position or in their folded-up position). Also, as best illustrated in FIG. 5, in the second embodiment of the invention, one clamping subassembly 48a, 58a from each of the two sets of pedal support assemblies 40, 41, 50' are mounted on a single adjustable upright support member 52 (i.e., a single adjustable upright support member 52 is disposed between the two pairs of rail members 20, 30). Advantageously, the single adjustable upright support member 52 in FIG. 5 (i.e., a perch column) is designed to hold clamping subassemblies 48a, 58a (i.e., perches) at two different heights. As shown in FIG. 4, the lower clamping subassembly 48a is provided with its own height adjustable collar 56 and height adjustment handle 55 (i.e., perch height lock collar and clamping screw with handle 55) so that the height of the lower clamping subassembly 48a may be adjusted relative to the upper clamping subassembly 58a. As shown in FIGS. 5 and 14, the second pedal 7 of the second bicycle 8 is supported by a third pedal support assembly 41 with an adjustable upright support member 53. In an extended version of the bicycle rack 200, the rack can be designed to hold more than two (2) bicycles (e.g., three (3) to four (4) bicycles), rather than just two (2) bicycles. As shown in FIG. 12, bike holder assemblies can be easily added and removed to the bicycle rack 200 as desired by a user thereof.

It is readily apparent that the aforedescribed bicycle rack 100, 200 offers numerous advantages. First, the bicycle rack is capable of supporting a bicycle from the bike components (i.e., the pedals) that are designed to withstand the greatest forces during the normal use of the bicycle. Secondly, the bicycle rack can be effectively used with high performance bicycles without damaging any of the special materials employed by these bicycles. Finally, the bicycle rack applies clamping pressure at the points on the bicycle that are most capable of withstanding such pressure (i.e., at the pedals).

Advantageously, as described above, the bicycle rack 100, 200 relies upon pedal support assemblies 40, 41, 50, 50' (i.e., stanchions) that clamp the pedals 5, 5', 7 in position as the primary means of support. The support system is assisted by the rail members 20, 30 (i.e., track rail support members) which stabilize the placement of the bicycle 8, but do not require the wheels 2, 4 to be clamped down in position. The reliance on clamping the pedals 5, 5', 7, and thus fixing the position of the bicycle 8, is of primary importance to the solid stability achieved by the aforedescribed invention. Advantageously, the trough-like rail members 20, 30 with the chock members 26, 36 provide horizontal, lateral, and axial support without the need for applying direct clamping pressure to either the frame or the wheels of the bicycle. As such, the bicycle rack 100, 200 is particularly well-suited for use with high performance bicycles made from special materials, such as composites (e.g., carbon fiber).

Although the invention has been shown and described with respect to a certain embodiment or embodiments, it is apparent that this invention can be embodied in many different forms and that many other modifications and variations are possible without departing from the spirit and scope of this invention.

Moreover, while exemplary embodiments have been described herein, one of ordinary skill in the art will readily appreciate that the exemplary embodiments set forth above are merely illustrative in nature and should not be construed as to limit the claims in any manner. Rather, the scope of the invention is defined only by the appended claims and their equivalents, and not, by the preceding description.

The invention claimed is:

1. A bicycle rack for a vehicle comprising, in combination:
   a central support assembly;
   a first rail member coupled to said central support assembly, said first rail member having an elongate groove formed therein for receiving a portion of a first wheel of a bicycle;
   a second rail member coupled to said central support assembly, said second rail member having an elongate groove formed therein for receiving a portion of a second wheel of said bicycle;
   a first pedal support assembly coupled to said central support assembly, said first pedal support assembly configured to structurally engage a first pedal of said bicycle in a supporting relationship; and
   a second pedal support assembly coupled to said central support assembly, said second pedal support assembly configured to structurally engage a second pedal of said bicycle in a supporting relationship;
   wherein each of said first and second pedal support assemblies comprises an adjustable upright support member and a clamping subassembly, said clamping subassembly comprising a lower clamping plate and an upper clamping plate, a respective one of said first and second pedals of said bicycle configured to be sandwiched between said lower clamping plate and said upper clamping plate, and said clamping subassembly further comprising a threaded clamping rod and an adjustable pivot pin, said threaded clamping rod having a first end and a second end, a first end of said threaded clamping rod engaging a plurality of internal threads in said lower clamping plate and/or in a weld nut attached thereto, a second end of said threaded clamping rod operatively coupled to said adjustable pivot pin, said upper clamping plate configured to rotate about said adjustable pivot pin.

2. The bicycle rack according to claim 1, wherein said central support assembly comprises a trailer hitch mounting bar, said trailer hitch mounting bar configured to be received within a receiver of a trailer hitch assembly on a vehicle.

3. The bicycle rack according to claim 1, wherein said first rail member and said second rail member are pivotally coupled to said central support assembly.

4. The bicycle rack according to claim 1, further comprising at least one chock member, at least a portion of said at least one chock member received within said elongate groove of one of said first and second rail members, said at least one chock member configured to stabilize one of said first and second wheels of said bicycle in said one of said first and second rail members.

5. The bicycle rack according to claim 4, wherein said at least one chock member comprises a first chock member and a second chock member, at least a portion of said first chock member received within said elongate groove of said first rail member, at least a portion of said second chock member received within said elongate groove of said second rail member, said first and second chock members configured to stabilize said first and second wheels of said bicycle in respective said first and second rail members.

6. The bicycle rack according to claim 1, wherein said clamping subassembly further comprises a lower clamping bracket attached to said lower clamping plate and a pivotable clamping latch member, said pivotable clamping latch member being rotatably coupled to said adjustable upright support member, and said pivotable clamping latch member including a lock eye for receiving a shackle portion of a padlock.

7. The bicycle rack according to claim 1, wherein said clamping subassembly further comprises a lower compression pad and an upper compression pad, said lower compression pad coupled to said lower clamping plate, and said upper compression pad coupled to said upper clamping plate, wherein said upper and lower compression pads are configured to be sandwiched between said respective one of said first and second pedals of said bicycle and a respective one of said upper and lower clamping plates.

8. The bicycle rack according to claim 1, wherein each of said first and second pedal support assemblies is configured to engage a shoe cleat locking mechanism on a bicycle pedal.

9. The bicycle rack according to claim 1, wherein said bicycle is configured to be mounted in at least one of the following locations: (i) proximate to the rear bumper of a vehicle; and (ii) on the roof of a vehicle.

10. The bicycle rack according to claim 1, wherein two or more sets of rail members and pedal support assemblies are mounted on said central support assembly so that two or more bicycles are capable of being transported by a vehicle using said bicycle rack.

11. The bicycle rack according to claim 10, wherein each of said two or more sets of rail members are disposed in a generally parallel relationship to one another.

12. The bicycle rack according to claim 10, wherein one clamping subassembly from each of said two or more sets of pedal support assemblies is mounted on a single one of said adjustable upright support members.

13. A bicycle rack for a vehicle comprising, in combination:
   a central support assembly;
   at least one rail member coupled to said central support assembly, said at least one rail member having an elongate groove formed therein for receiving a portion of a first wheel and a portion of a second wheel of a bicycle;
   a first pedal support assembly coupled to said central support assembly, said first pedal support assembly structurally engaging a first pedal of said bicycle in a supporting relationship when said bicycle is supported in said bicycle rack, said first pedal support assembly being laterally spaced apart from a first crank arm of said bicycle by a first gap when said bicycle is supported in said bicycle rack; and
   a second pedal support assembly coupled to said central support assembly, said second pedal support assembly structurally engaging a second pedal of said bicycle in a supporting relationship when said bicycle is supported in said bicycle rack, said second pedal support assembly being laterally spaced apart from a second crank arm of said bicycle by a second gap when said bicycle is supported in said bicycle rack.

14. The bicycle rack according to claim 13, wherein each of said first and second pedal support assemblies comprises a clamping subassembly, said clamping subassembly comprising a lower clamping member and an upper clamping member, a respective one of said first and second pedals of said bicycle being disposed between said lower clamping member and said upper clamping member.

15. The bicycle rack according to claim 14, wherein each of said first and second pedal support assemblies further comprises an adjustable upright support member, and wherein said clamping subassembly further comprises a pivotable clamping latch member, said pivotable clamping latch member being rotatably coupled to said adjustable upright support member, and said pivotable clamping latch member including a lock eye for receiving a shackle portion of a padlock.

16. The bicycle rack according to claim 13, wherein each of said first and second pedal support assemblies engages a shoe cleat locking mechanism on a bicycle pedal when said bicycle is supported in said bicycle rack.

17. A bicycle rack system for a vehicle comprising, in combination:
   a bicycle having a frame, a first wheel rotatably coupled to said frame, a second wheel rotatably coupled to said frame, and first and second pedals operatively coupled to said second wheel; and
   a bicycle rack configured to support said bicycle from a vehicle, said bicycle rack including:
   a central support assembly;
   a first rail member coupled to said central support assembly, said first rail member having an elongate groove formed therein for receiving a portion of said first wheel of said bicycle;
   a second rail member coupled to said central support assembly, said second rail member having an elongate groove formed therein for receiving a portion of said second wheel of said bicycle;
   a first pedal support assembly coupled to said central support assembly, said first pedal support assembly structurally engaging said first pedal of said bicycle in a supporting relationship; and
   a second pedal support assembly coupled to said central support assembly, said second pedal support assembly structurally engaging said second pedal of said bicycle in a supporting relationship;
   wherein each of said first and second pedal support assemblies comprises a clamping subassembly, said clamping subassembly comprising a lower clamping member and an upper clamping member, a respective one of said first and second pedals of said bicycle being disposed between said lower clamping member and said upper clamping member.

18. The bicycle rack system according to claim 17, wherein said first rail member and said second rail member of said bicycle rack are pivotally coupled to said central support assembly, and wherein said first rail member and said second rail member are configured to be locked in an upright position by respective pin members.

19. The bicycle rack system according to claim 17, wherein said central support assembly comprises a trailer hitch vertical post member, said trailer hitch vertical post member configured to engage with a bracket member of a vertically-oriented trailer hitch assembly on a vehicle.

20. The bicycle rack system according to claim 17, wherein each of said first and second pedal support assemblies further comprises a plurality of pedal insert members, each of said pedal insert members having one or more protruding portions that engage with apertures in at least one of said first and second pedals of said bicycle.

* * * * *